(12) United States Patent
Anzai

(10) Patent No.: US 11,584,443 B2
(45) Date of Patent: Feb. 21, 2023

(54) FRONT STRUCTURE OF VEHICLE BODY

(71) Applicant: Honda Motor Co., Ltd., Tokyo (JP)

(72) Inventor: Hiroyuki Anzai, Tokyo (JP)

(73) Assignee: Honda Motor Co., Ltd., Tokyo (JP)

(*) Notice: Subject to any disclaimer, the term of this patent is extended or adjusted under 35 U.S.C. 154(b) by 16 days.

(21) Appl. No.: 17/495,808

(22) Filed: Oct. 6, 2021

(65) Prior Publication Data

US 2022/0204087 A1    Jun. 30, 2022

(30) Foreign Application Priority Data

Dec. 24, 2020   (JP) .............................. JP2020-215287

(51) Int. Cl.
| | | |
|---|---|---|
| *B62D 21/15* | (2006.01) | |
| *B62D 27/02* | (2006.01) | |
| *B62D 25/08* | (2006.01) | |
| *B62D 21/11* | (2006.01) | |

(52) U.S. Cl.
CPC ........... *B62D 21/155* (2013.01); *B62D 27/02* (2013.01); *B62D 21/11* (2013.01); *B62D 21/152* (2013.01); *B62D 25/08* (2013.01)

(58) Field of Classification Search
CPC ...... B62D 21/155; B62D 27/02; B62D 21/11; B62D 25/08; B62D 21/152
USPC .................................................. 296/187.09
See application file for complete search history.

(56) References Cited

U.S. PATENT DOCUMENTS

| | | | | |
|---|---|---|---|---|
| 6,957,846 | B2* | 10/2005 | Saeki ................... | B62D 21/152 |
| | | | | 296/187.1 |
| 9,004,576 | B2* | 4/2015 | Sakakibara .......... | B62D 25/085 |
| | | | | 296/203.02 |
| 9,073,503 | B2* | 7/2015 | Ookubo .................. | B60R 19/18 |
| 9,676,416 | B2* | 6/2017 | Kitakata ............... | B62D 21/152 |
| 9,771,106 | B2* | 9/2017 | Ogawa ................... | B62D 25/08 |
| 9,868,468 | B1* | 1/2018 | Park ...................... | B62D 25/085 |

(Continued)

FOREIGN PATENT DOCUMENTS

| | | |
|---|---|---|
| JP | S49126017 | 12/1974 |
| JP | 2855411 | 2/1999 |
| JP | 2013129384 | 7/2013 |

(Continued)

OTHER PUBLICATIONS

"Office Action of Japan Counterpart Application" with English translation thereof, dated Aug. 23, 2022, p. 1-p. 4.

*Primary Examiner* — D Glenn Dayoan
*Assistant Examiner* — Dana D Ivey
(74) *Attorney, Agent, or Firm* — JCIPRNET

(57) ABSTRACT

A front portion of a vehicle body includes front side frames, a subframe, and a vehicle compartment front structure body. The subframe has a subframe body, a leg portion, a front fastening portion, and a rear fastening portion. The front side frame has a subframe mounting portion which is arranged on a front side of a bending starting point and to which the front fastening portion is fastened. A component mounting bracket having an inclined guide portion with a front surface inclining downward toward a vehicle rear side is coupled to a rear side of the bending starting point of the front side frame. The inclined guide portion is arranged on a track in which the leg portion detached from the front side frame is displaced rearward when an impact load is input from the front of the vehicle.

9 Claims, 17 Drawing Sheets

(56) References Cited

U.S. PATENT DOCUMENTS 9,969,432 B2 * 5/2018 Matsushima ........ B62D 25/082
2013/0320710 A1 * 12/2013 Watanabe ............ B62D 21/152
296/203.02

FOREIGN PATENT DOCUMENTS

| JP | 2014004990 | 1/2014 |
| JP | 2017132371 | 8/2017 |
| JP | 2018140711 | 9/2018 |
| WO | 2012060257 | 5/2012 |

* cited by examiner

FRONT STRUCTURE OF VEHICLE BODY

CROSS-REFERENCE TO RELATED APPLICATION

This application claims the priority benefits of Japanese application no. 2020-215287, filed on Dec. 24, 2020. The entirety of the above-mentioned patent application is hereby incorporated by reference herein and made a part of this specification.

BACKGROUND

Technical Field

The disclosure relates to a front structure of a vehicle body.

Description of Related Art

A structure of a front portion of a vehicle body is known, in which a dash lower panel that separates between a vehicle compartment and an engine room is provided with an inclined wall that inclines downward toward the vehicle rear side, and when an impact load is input from the front of the vehicle, mounted components that move rearward are dropped downward along the inclined wall (see Patent Document 1, for example).

In the front structure of the vehicle body described in Patent Document 1, an auxiliary plate is attached to the front surface side of the inclined wall of the dash lower panel, and a drive device such as an engine is arranged on the front side of the auxiliary plate. In this front structure of the vehicle body, when an impact load is input from the front of the vehicle and causes the drive device to come into contact with the auxiliary plate, the auxiliary plate is separated from the dash panel and the auxiliary plate, together with the drive device, falls downward along the inclined wall of the dash panel.

RELATED ART

Patent Document

[Patent Document 1] Japanese Patent No. 2855411

Problems to be Solved

The front structure of the vehicle body described in Patent Document 1 can drop the drive device downward when an impact load is input from the front of the vehicle to prevent entry of the drive device in the direction into the vehicle compartment. However, for many vehicles in recent years, a subframe is arranged on the rear side of the engine (drive device), and steering components and suspension components are supported by the subframe. In such vehicles, the structure described in Patent Document 1 cannot be adopted.

The subframe arranged in the engine room is erected below the left and right front side frames, and the rear end side portion is coupled to a vehicle compartment front structure body in front of the vehicle compartment. Further, on the upper portion of the subframe, mounted components such as a steering gear box are attached so as to bulge upward. In the case of such a front structure of the vehicle body, it is desired to smoothly drop the rigid subframe downward on the front side of the vehicle compartment when an impact load is input from the front of the vehicle.

However, since the above subframe is erected below the left and right front side frames that bend and deform when an impact load is input from the front of the vehicle, it is difficult to stably drop the subframe to the front side of the vehicle compartment when an impact load is input from the front of the vehicle.

SUMMARY

A front structure of a vehicle body according to the disclosure adopts the following configuration. That is, the front structure of the vehicle body according to the disclosure includes: a pair of left and right front side frames (for example, the front side frames 7 of the embodiment) extending to a front of a vehicle on a front side of a vehicle compartment; a subframe (for example, the subframe 8 of the embodiment) erected below the pair of front side frames; and a vehicle compartment front structure body (for example, the vehicle compartment front structure body 30 of the embodiment) arranged in a front portion of the vehicle compartment. The subframe includes: a subframe body (for example, the subframe body 41 of the embodiment) supporting a mounted component; a leg portion (for example, the leg portion 42 of the embodiment) protruding upward from a front region of the subframe body; a front fastening portion (for example, the front fastening portion 34 of the embodiment) provided at a top portion of the leg portion and fastened to the front side frame; and a rear fastening portion (for example, the rear fastening portion 35 of the embodiment) fastened to the vehicle compartment front structure body in a rear region on left and right of the subframe body. The front side frame includes: a bending starting point (for example, the bending starting point 22 of the embodiment) which is a starting point of bending and deformation when an impact load is input from the front of the vehicle; and a subframe mounting portion (for example, the mounting bracket 23 of the embodiment) which is arranged on a front side of the bending starting point and to which the front fastening portion is fastened. A component mounting bracket (for example, the component mounting bracket 25 of the embodiment) having an inclined guide portion (for example, the inclined guide portion 24 of the embodiment) with a front surface inclining downward toward a vehicle rear side is coupled below a rear portion side of the bending starting point of the front side frame, and the inclined guide portion is arranged on a track in which the leg portion detached from the front side frame is displaced rearward when the impact load is input from the front of the vehicle.

DESCRIPTION OF THE EMBODIMENTS

Figure 1:
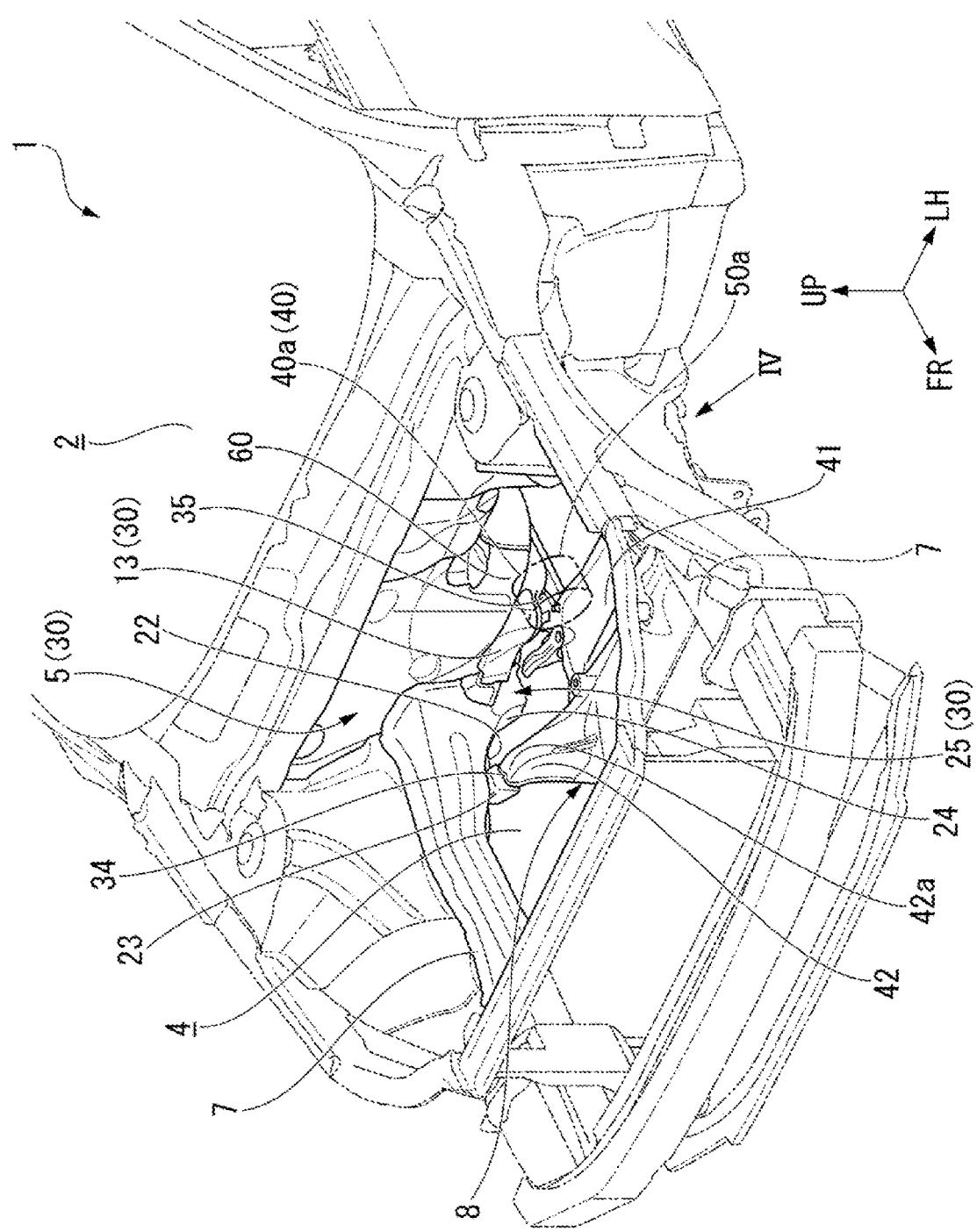
FIG. 1 is a perspective view of the front portion of the vehicle of the embodiment.

The disclosure provides a front structure of a vehicle body that can smoothly drop the subframe downward on the front side of the vehicle compartment when an impact load is input from the front of the vehicle.

Means for Solving the Problems

A front structure of a vehicle body according to the disclosure adopts the following configuration. That is, the front structure of the vehicle body according to the disclosure includes: a pair of left and right front side frames (for example, the front side frames 7 of the embodiment) extending to a front of a vehicle on a front side of a vehicle compartment; a subframe (for example, the subframe 8 of the embodiment) erected below the pair of front side frames; and a vehicle compartment front structure body (for example, the vehicle compartment front structure body 30 of the embodiment) arranged in a front portion of the vehicle compartment. The subframe includes: a subframe body (for example, the subframe body 41 of the embodiment) supporting a mounted component; a leg portion (for example, the leg portion 42 of the embodiment) protruding upward from a front region of the subframe body; a front fastening portion (for example, the front fastening portion 34 of the embodiment) provided at a top portion of the leg portion and fastened to the front side frame; and a rear fastening portion (for example, the rear fastening portion 35 of the embodiment) fastened to the vehicle compartment front structure body in a rear region on left and right of the subframe body. The front side frame includes: a bending starting point (for example, the bending starting point 22 of the embodiment) which is a starting point of bending and deformation when an impact load is input from the front of the vehicle; and a subframe mounting portion (for example, the mounting bracket 23 of the embodiment) which is arranged on a front side of the bending starting point and to which the front fastening portion is fastened. A component mounting bracket (for example, the component mounting bracket 25 of the embodiment) having an inclined guide portion (for example, the inclined guide portion 24 of the embodiment) with a front surface inclining downward toward a vehicle rear side is coupled below a rear portion side of the bending starting point of the front side frame, and the inclined guide portion is arranged on a track in which the leg portion detached from the front side frame is displaced rearward when the impact load is input from the front of the vehicle.

In the above configuration, when an impact load is input from the front of the vehicle, the subframe is pressed toward the vehicle rear side, and the front region (subframe mounting portion) of the bending starting point of the front side frame bends and deforms with the bending starting point as the center. As a result, the front fastening portion of the subframe is relatively pulled, and the front fastening portion is detached from the front side frame. Then, when the subframe is further pressed toward the vehicle rear side, the entire subframe is displaced toward the vehicle rear side, and the top portion of the leg portion comes into contact with the inclined guide portion of the component mounting bracket. As a result, the subframe falls downward on the front side of the vehicle along the inclined guide portion.

The front fastening portion having a fixing nut to which a bolt (for example, the bolt 43 of the embodiment) is fastened may be provided on a side surface of the top portion of the leg portion. The subframe mounting portion may have a slit (for example, the slit 44 of the embodiment) that opens downward for inserting the bolt, and the front fastening portion may be locked to the front side frame by fastening the bolt inserted through the slit to the fixing nut.

In this case, when an impact load is input from the front of the vehicle, the front side frame bends with the bending starting point as the center, and when the front side portion of the bending starting point bends and deforms upward, the front fastening portion is pulled relatively downward. At this time, the bolt fixed to the fixing nut of the front fastening portion is pulled downward along the slit of the subframe mounting portion. Accordingly, when this configuration is adopted, the front fastening portion of the subframe is stably dropped rearward and downward when an impact load is input from the front of the vehicle.

It is desirable that the subframe is an aluminum casting.

In this case, since the rigidity of the subframe is high, when an impact load is input from the front of the vehicle, the top portion of the leg portion is stably guided rearward and downward while biting into the inclined guide portion.

The inclined guide portion may have a recessed portion (for example, the recessed portion 31 of the embodiment) that extends in a vertical direction.

In this case, the inclined guide portion is reinforced by the recessed portion that extends in the vertical direction. Further, when an impact load is input from the front of the vehicle, it is possible to slide down the top portion of the leg portion of the subframe rearward and downward along the recessed portion.

The recessed portion may extend from a front surface to a lower surface of the component mounting bracket, and a rear end joint portion (for example, the rear end joint portion 32 of the embodiment) joined to the front surface of the component mounting bracket so as to be continuous with an upper end portion of the recessed portion may be provided on a lower wall on a rear portion side of the front side frame.

In this case, since the recessed portion extends from the front surface to the lower surface of the component mounting bracket, when the top portion of the leg portion of the subframe is pressed against the inclined guide portion at the time of input of an impact load from the front of the vehicle, the top portion can be properly slid down rearward and downward along the recessed portion without being caught excessively. In addition, since the rear end joint portion of the front side frame is joined to the component mounting bracket so as to be continuous with the upper end portion of the recessed portion, when an impact load is input from the front of the vehicle, the load transmitted to the rear portion of the front side frame can be properly transmitted to the further rear side of the vehicle via the component mounting bracket.

It is desirable that the component mounting bracket is an aluminum casting or a member having a rigidity equivalent to a rigidity of the aluminum casting.

In this case, the component mounting bracket that comes into contact with the leg portion of the subframe when an impact load is input from the front of the vehicle is made of a member having a rigidity equivalent to that of the subframe. Therefore, when the leg portion of the subframe comes into contact with the inclined guide portion, the leg portion can be properly guided rearward and downward without causing excessive deformation of one member. Further, when the outer side portion in the vehicle width direction of the mount holding plate that holds the support mount of the suspension arm is attached to the component mounting bracket, and the inner side portion in the vehicle width direction of the mount holding plate is attached to the subframe, the support rigidities of the inner side portion and the outer side portion in the vehicle width direction of the mount holding plate become equal, and the steering stability of the vehicle is improved.

The component mounting bracket may be arranged so as to be aligned with the top portion of the leg portion of the subframe in a vehicle front-rear direction.

In this case, when an impact load is input from the front of the vehicle, the top portion of the leg portion of the subframe can be reliably brought into contact with the inclined guide portion of the component mounting bracket, and can be smoothly slid down rearward and downward.

A tunnel frame (for example, the tunnel frame 11 of the embodiment) that extends in the vehicle front-rear direction may be arranged at a position deviated from the front side frame in a vehicle width direction below the vehicle compartment. A second inclined guide portion (for example, the inclined guide portion 33 of the embodiment) having a front surface that inclines downward toward the vehicle rear side may be provided at a front portion of the tunnel frame, and the second inclined guide portion may be arranged on a track in which the rear fastening portion is displaced rearward when the impact load is input from the front of the vehicle.

In this case, when an impact load is input from the front of the vehicle, the rear fastening portion is guided by the second inclined guide portion and guided rearward and downward, and the leg portion having the front fastening portion is guided by the inclined guide portion of the component mounting bracket and guided rearward and downward. Accordingly, when this configuration is adopted, it is possible to stably drop the subframe below the front portion of the vehicle compartment.

The subframe mounting portion may have a fixing nut which is provided on a lower surface of the front side frame and to which a bolt (for example, the bolt 43 of the embodiment) is fastened. The front fastening portion having a slit (for example, the slit 144 of the embodiment) that opens outward in a vehicle width direction for inserting a bolt may be provided on an upper surface of the top portion of the leg portion, and the front fastening portion may be locked to the front side frame by fastening the bolt inserted through the slit to the fixing nut.

In this case, when an impact load is input from the front of the vehicle, the front side frame bends with the bending starting point as the center, and when the front side portion of the bending starting point bends and deforms outward in the vehicle width direction, the bolt fixed to the fixing nut is pushed outward in the vehicle width direction along with the bending and deformation. At this time, the bolt comes outside the leg portion in the vehicle width direction along the slit. Accordingly, when this configuration is adopted, the front fastening portion of the subframe is reliably detached from the front side frame and the subframe falls rearward and downward when an impact load is input from the front of the vehicle.

Effects

According to the disclosure, the subframe mounting portion is provided on the front side of the bending starting point of the front side frame on the left and right and the front fastening portion of the subframe is fastened to the subframe mounting portion, and the component mounting bracket having the inclined guide portion is coupled below the rear portion side of the bending starting point of the front side frame on the left and right. Then, the inclined guide portion is arranged on a track in which the leg portion of the subframe detached from the front side frame is displaced rearward when an impact load is input from the front of the vehicle. Therefore, when an impact load is input from the front of the vehicle, the leg portion of the subframe detached along with the bending and deformation of the front side frame comes into contact with the inclined guide portion along with the rearward displacement of the subframe and is guided rearward and downward of the inclined guide portion. Accordingly, when the disclosure is adopted, the subframe can be smoothly dropped downward on the front side of the vehicle compartment when an impact load is input from the front of the vehicle.

Hereinafter, embodiments of the disclosure will be described with reference to the drawings. In addition, an arrow FR pointing to the front side of a vehicle, an arrow UP pointing to the upper side of the vehicle, and an arrow LH pointing to the left side of the vehicle are marked at appropriate positions in the drawings.

Figure 2:
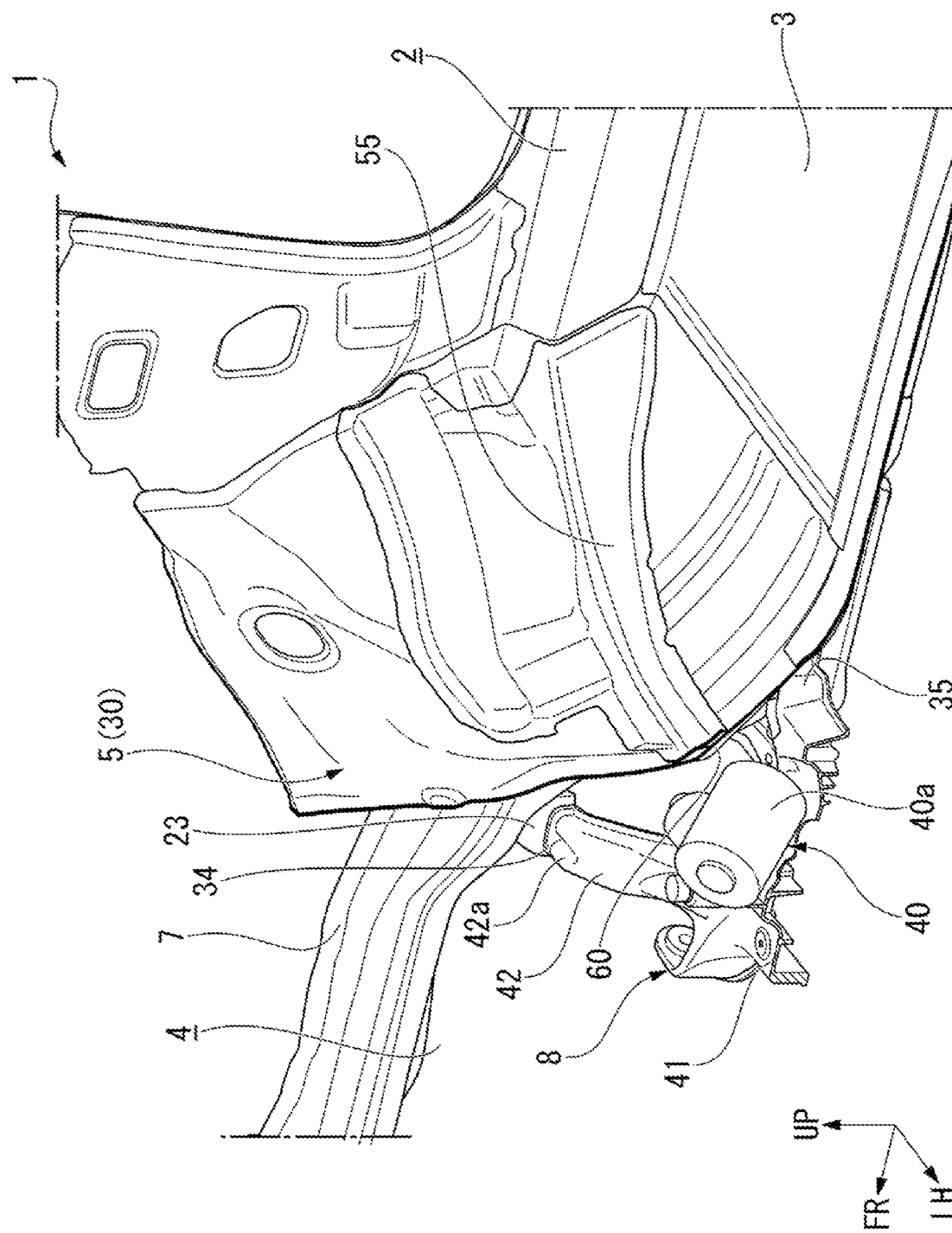
FIG. 2 is a partial cross-sectional perspective view of the front portion of the vehicle of the embodiment.
Figure 3:
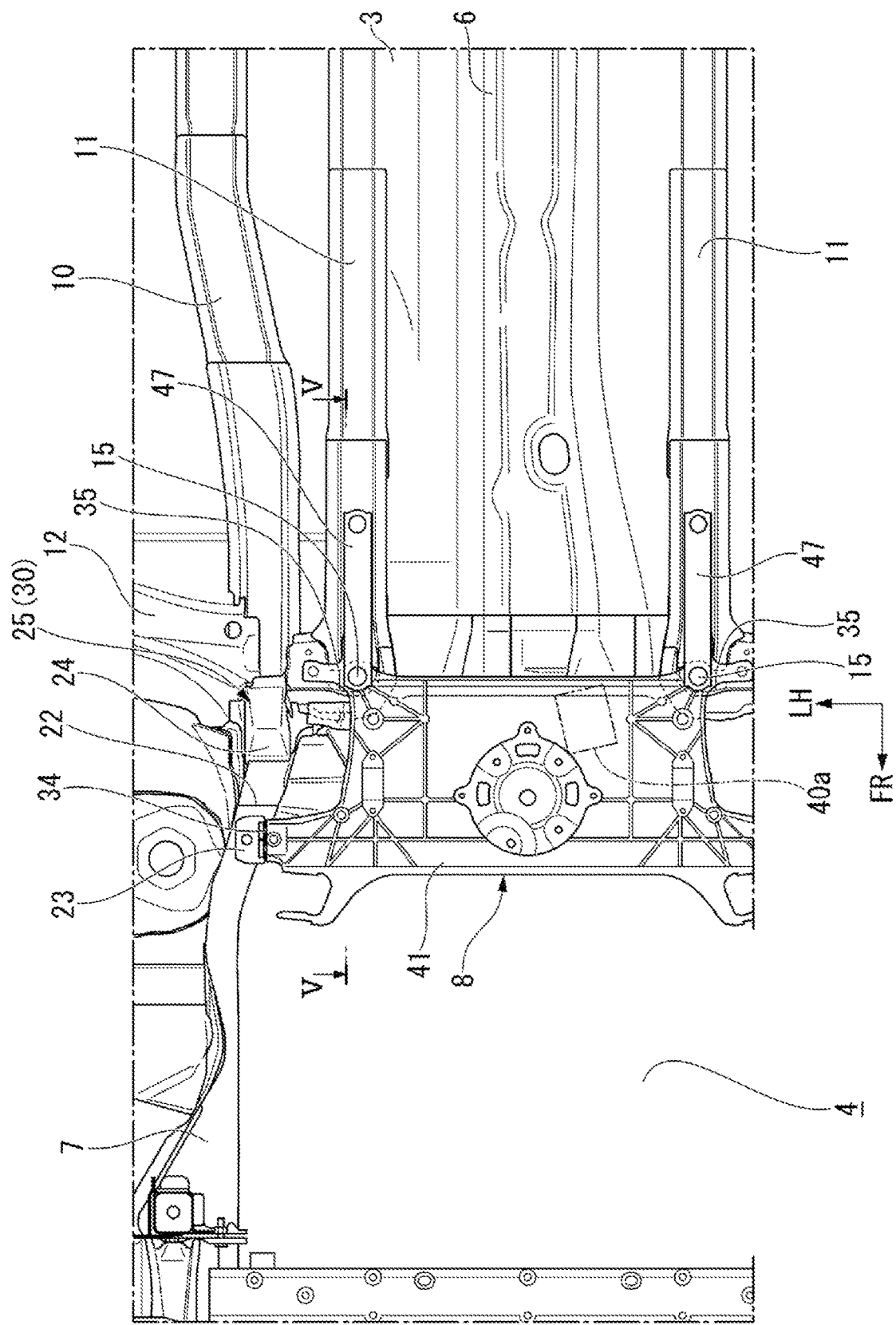
FIG. 3 is a bottom view of the front portion of the vehicle of the embodiment.

FIG. 1 is a perspective view of viewing the front portion of the vehicle 1 of the present embodiment from the upper left diagonally. FIG. 2 is a partial cross-sectional perspective view of cutting the front portion of the vehicle 1 at a portion slightly to the right of the center in a vehicle width direction, and viewing the portion from the rear left upper side diagonally. Further, FIG. 3 is a bottom view of the front portion of the vehicle 1. As shown in FIG. 2, the rear end portion of a dash lower panel 5 that separates a vehicle compartment 2 and an engine room 4 (front compartment) in front of the vehicle compartment 2 is joined to the front end portion of a floor panel 3 arranged below the vehicle compartment 2. The dash lower panel 5 stands diagonally upward on the front side from the joint with the floor panel 3. Further, as shown in FIG. 3, in the central portion of the floor panel 3 in the vehicle width direction, a floor tunnel portion 6 that bulges upward extends along a vehicle front-rear direction. The lower edge of the central region of the dash lower panel 5 in the vehicle width direction is connected to the front end portion of the floor tunnel portion 6, and the amount of bulge toward the front side is smaller than that of the other regions on the left and right.

A pair of left and right front side frames 7, which are the main skeleton members of the front portion of the vehicle body, are provided on the front side of the vehicle compartment 2. The left and right front side frames 7 extend toward the front of the vehicle on the left and right front sides of the vehicle compartment 2. A subframe 8 for supporting steering components and suspension components is erected below the left and right front side frames 7 near the rear portion. The subframe 8 is an aluminum casting having a substantially rectangular shape in the plan view, and is fixed to the left and right front side frames 7 and a vehicle compartment front structure body 30 (to be described later) by fastening bolts. A power unit (not shown) such as an engine or a drive motor is supported by a front frame portion (not shown) connected to the front portion of the subframe 8. The front frame portion is erected in the central region in the front-rear direction of the left and right front side frames 7.

Figure 4:
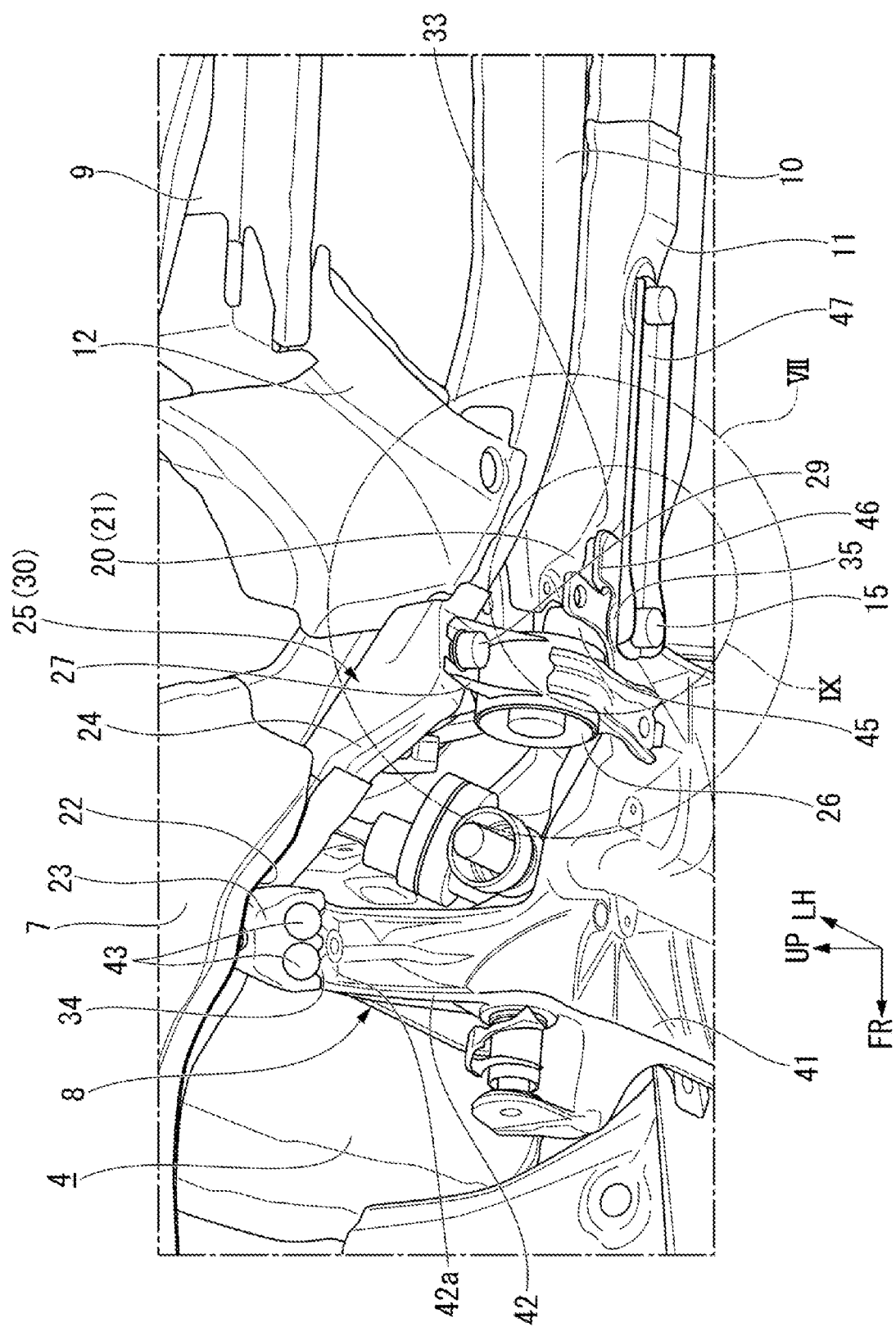
FIG. 4 is a perspective view, corresponding to the arrow view IV of FIG. 1, of the front portion of the vehicle of the embodiment.

FIG. 4 is a perspective view, corresponding to the arrow view IV of FIG. 1, of the front portion of the vehicle 1. Side sills 9 (see FIG. 4), which are skeleton members extending along the vehicle body front-rear direction, are arranged at the lower ends on both the left and right sides of the vehicle compartment 2. Floor frames 10 extending substantially along the vehicle front-rear direction are arranged on the inner side of the left and right side sills 9 in the vehicle width direction. Further, as shown in FIG. 3, tunnel frames 11 extending substantially along the vehicle front-rear direction are arranged between the left and right floor frames 10 and the central floor tunnel portion 6. Both the floor frame 10 and the tunnel frame 11 are formed in a hat-shaped cross-sectional shape that opens to the upper side, and the floor panel 3 is joined to the upper surfaces thereof. The floor frame 10 and the tunnel frame 11 form a closed cross section extending substantially along the vehicle front-rear direction with the floor panel 3.

As shown in FIG. 4, the front end portion of each of the left and right side sills 9 and the front region of the adjacent floor frame 10 are connected to each other by an outrigger 12 having a closed cross-section structure. Further, the front end portion of the floor frame 10 is further curved and extends forward and upward from the portion connecting with the outrigger 12, and is connected to the rear portion of the corresponding front side frame 7 on the left and right. Therefore, the rear portions of the left and right front side frames 7 are continuous with the corresponding floor frames 10 below the vehicle compartment 2.

Figure 5:
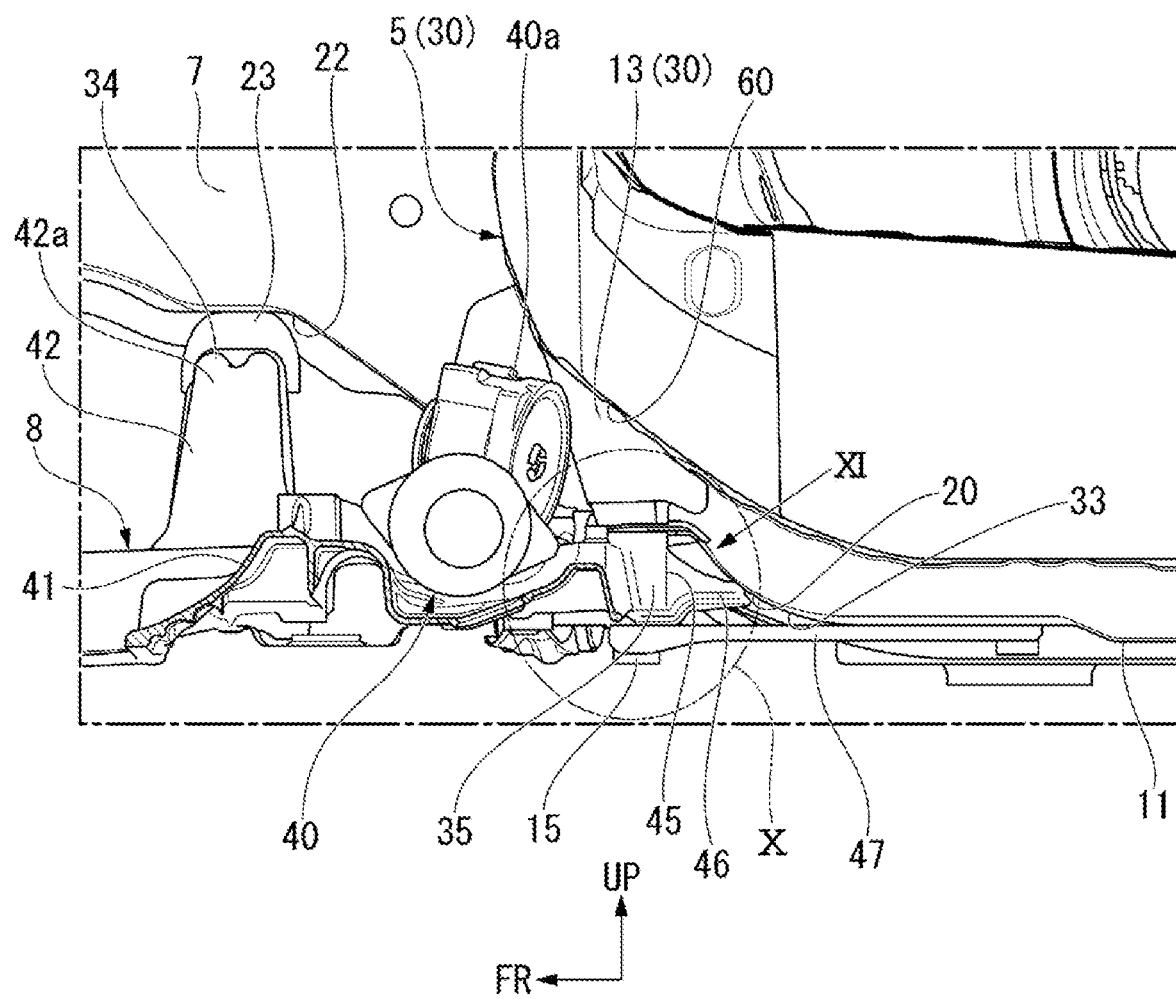
FIG. 5 is a partial cross-sectional side view of the front portion of the vehicle corresponding to the cross section V-V of FIG. 3 of the embodiment.
Figure 6:
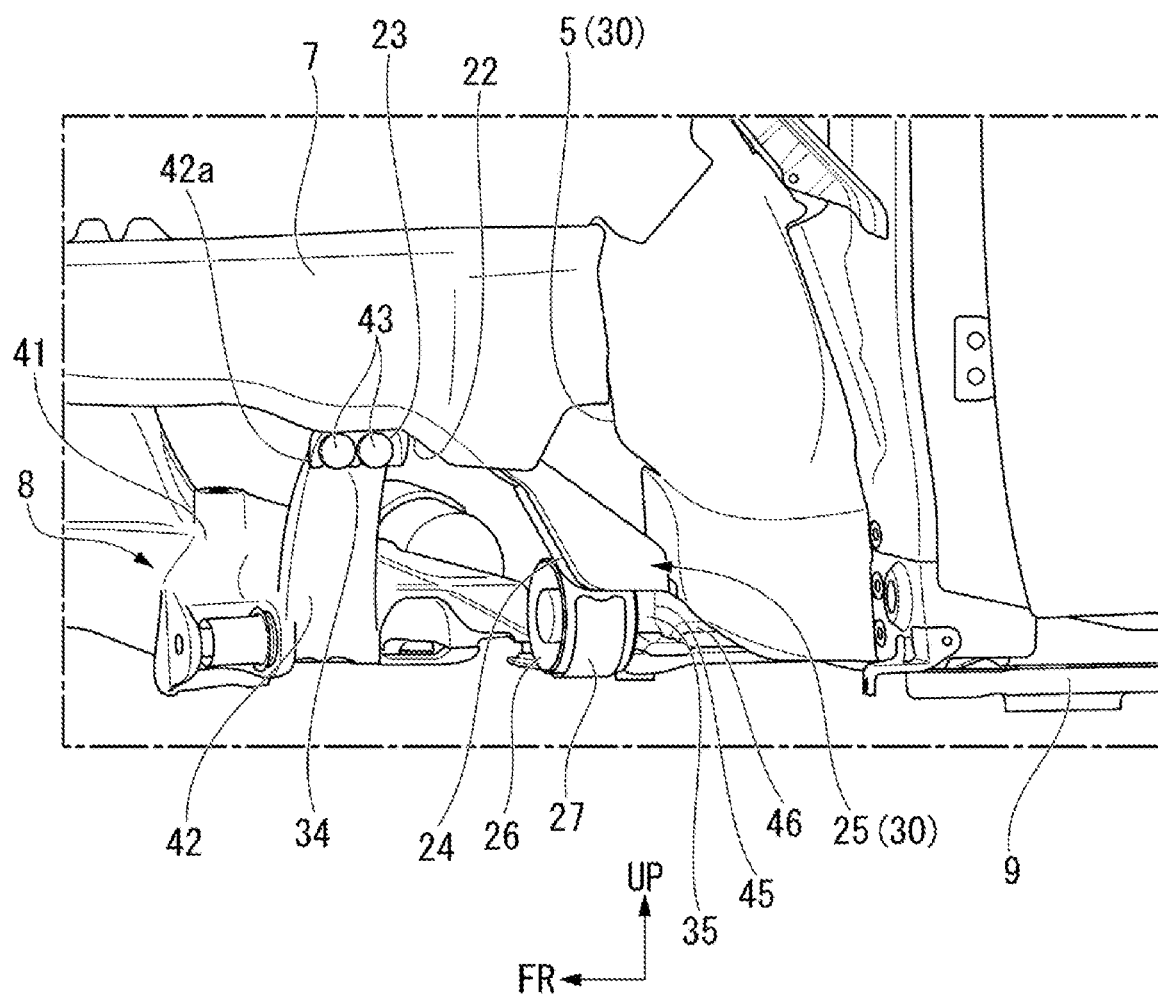
FIG. 6 is a left side view of the front portion of the vehicle of the embodiment.
Figure 7:
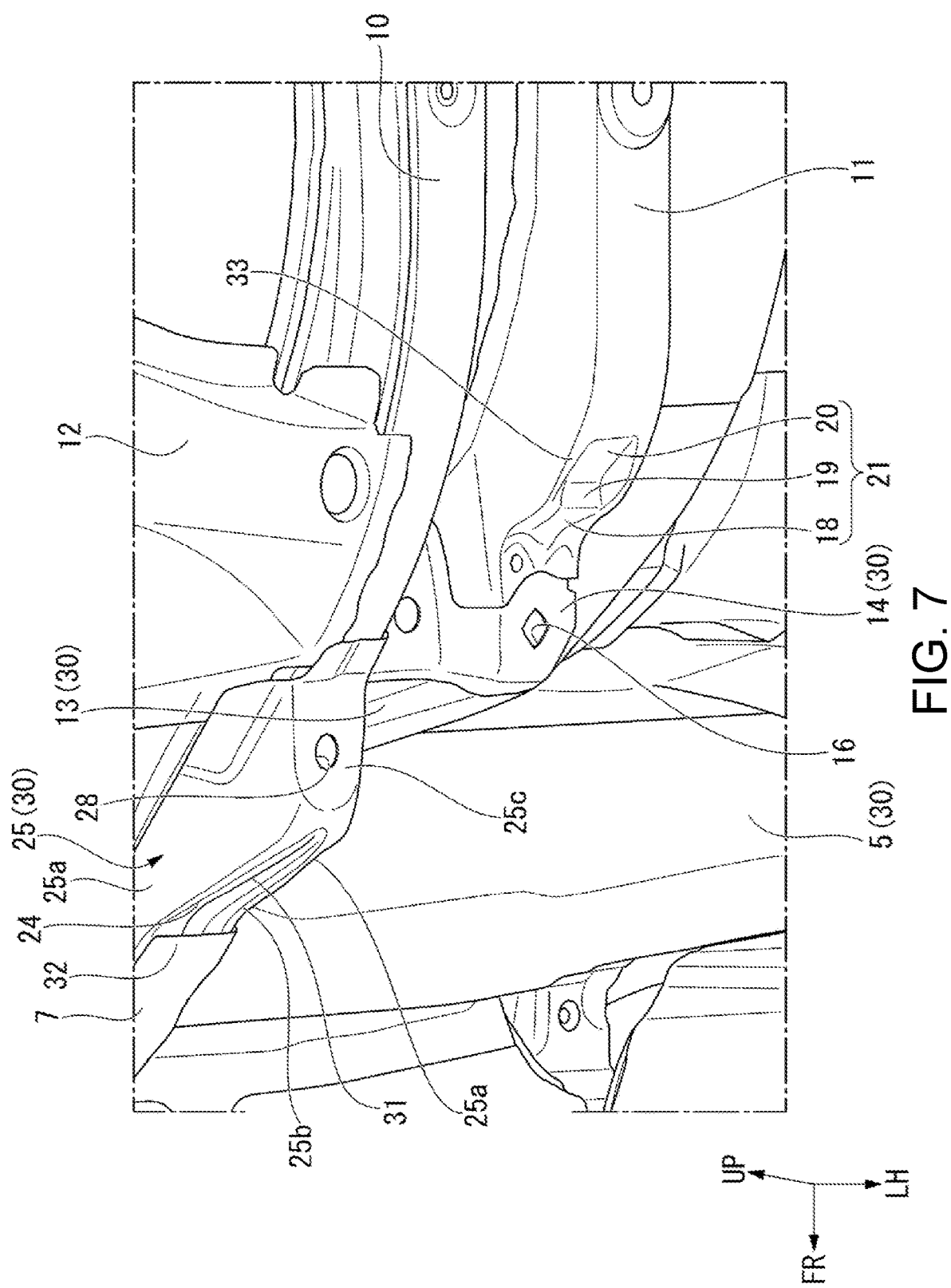
FIG. 7 is an enlarged view of the part VII of FIG. 4 of the front portion of the vehicle of the embodiment with some components removed.
Figure 8:
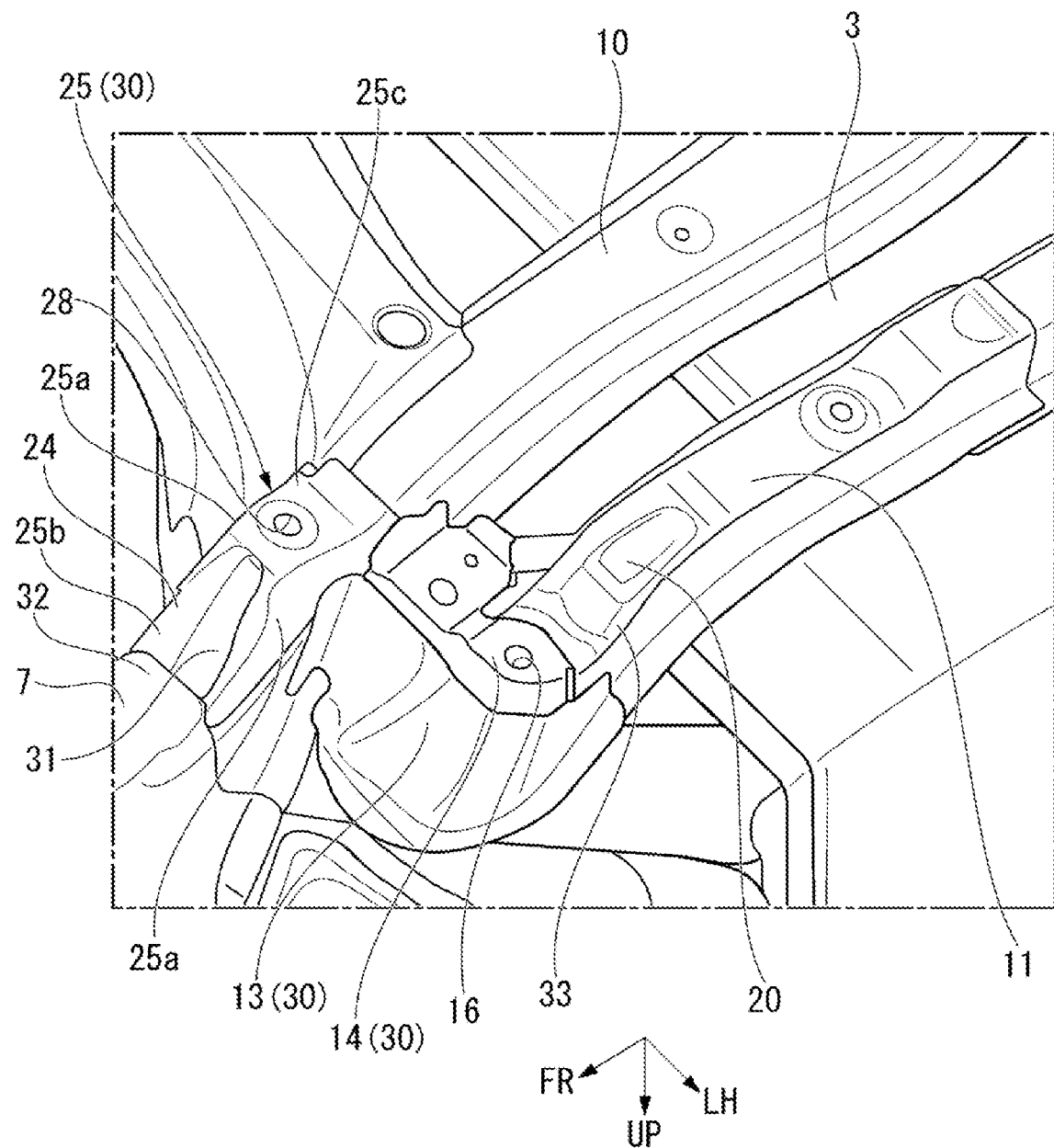
FIG. 8 is a perspective view of viewing substantially the same portion as FIG. 7 of the front portion of the vehicle of the embodiment from another angle.

FIG. 5 is a partial cross-sectional side view of the front portion of the vehicle 1 corresponding to the cross section V-V of FIG. 3, and FIG. 6 is a left side view of the front portion of the vehicle 1. Further, FIG. 7 is an enlarged view of the part VII of FIG. 4 of the front portion of the vehicle 1 with some components removed, and FIG. 8 is a perspective view of viewing substantially the same portion as FIG. 7 of the front portion of the vehicle 1 from another angle. As shown in FIG. 7 and FIG. 8, the front region of the floor frame 10 and the front end portion of the adjacent tunnel frame 11 are connected to each other via a mount bracket 13. The mount bracket 13 is joined to the lower surface of the lower region of the rising portion of the dash lower panel 5 and forms a closed cross section with the dash lower panel 5. The end portion of the mount bracket 13 on the side of the tunnel frame 11 is joined to the tunnel frame 11 so as to surround the peripheral region of the front end portion of the tunnel frame 11 and a part of the lower surface. An opening 50 (see FIG. 11) is formed on the lower surface of the mount bracket 13. A support plate 14 is attached to the mount bracket 13 so as to close the opening 50 on the lower surface. The support plate 14 is formed of a metal plate having a smaller wall thickness than the mount bracket 13. A bolt insertion hole 16 is formed in the support plate 14 at a position facing the front side region of the tunnel frame 11. A bolt 15 (see FIG. 3 to FIG. 5) for fixing a rear fastening portion 35 (to be described later) of the subframe 8 is inserted into the bolt insertion hole 16 from below. A fixing nut 17 (see FIG. 10 and FIG. 11) into which the shaft portion of the bolt 15 inserted into the bolt insertion hole 16 is screwed is attached to the upper surface side of the support plate 14. Since the support plate 14 is a thin plate made of metal, when an impact load of a predetermined value or more is input from the rear fastening portion 35 of the subframe 8 through the bolt 15, the peripheral edge portion of the fixing nut 17 may break. As a result, the rear fastening portion 35 is allowed to be detached (dropped) from the mount bracket 13 (vehicle compartment front structure body 30).

Furthermore, the front edge portion of the tunnel frame 11 is stacked and joined to the rear edge portion of the mount bracket 13. As shown in FIG. 7, at the front edge portion of the tunnel frame 11, a front wall 18 extending downward while slightly inclining to the rear side from the rear portion of the portion overlapped with the lower surface of the mount bracket 13, a substantially horizontal wall 19 extending from the lower end of the front wall 18 to the vehicle rear side, and an inclined wall 20 inclining downward from the rear end of the substantially horizontal wall 19 toward the vehicle rear side are continuously formed. The front wall 18, the substantially horizontal wall 19, and the inclined wall 20 constitute a step portion 21 at the front edge portion of the tunnel frame 11. The entire front surface of the step portion 21 inclines downward toward the vehicle rear side. The inclined portion on the front surface of the step portion 21 constitutes an inclined guide portion 33 (second inclined guide portion). The inclined guide portion 33 is arranged on a track in which the rear fastening portion 35 of the subframe 8 is displaced rearward when an impact load is input from the front of the vehicle. Further, the inclined wall 20 of the step portion 21 constitutes a fall restricting wall (to be described later).

As shown in FIG. 5 and FIG. 6, each of the left and right front side frames 7 has a narrower vertical width on the rear end side than the vertical width on the front end side. On the lower surface near the rear portion of each front side frame 7, there is a portion where the height of the lower surface is stepped high (the vertical width narrows in a stepped manner) with respect to the substantially horizontal upper surface. The portion stepped high (the root of the portion where the vertical width narrows in a stepped manner) is a bending starting point 22 where the front side frame 7 receives a load and bends and deforms when an impact load is input from the front of the vehicle. When the front side frame 7 receives an impact load from the front side thereof, the front side frame 7 bends and deforms so that the front side of the bending starting point 22 is lifted upward with the bending starting point 22 as the center (see FIG. 17 and FIG. 18). Further, a mounting bracket 23 (subframe mounting portion) to which a front fastening portion 34 (to be described later) of the subframe 8 is fastened is fixed at the front side position of the bending starting point 22 on the lower surface of each front side frame 7.

In addition, a component mounting bracket 25 having an inclined guide portion 24 is integrally coupled at the position rearward and downward of the bending start point 22 of each front side frame 7. As shown in FIG. 7 and FIG. 8, the component mounting bracket 25 has a pair of side walls 25*a* having a substantially triangular shape in the side view, a front wall 25*b* connecting the front end portions of the pair of side walls 25*a*, and a lower wall 25*c* connecting the lower end portions of the pair of side walls 25*a*, and the front surface side of the front wall 25*b* is the inclined guide portion 24. The front surface of the inclined guide portion 24 inclines downward toward the vehicle rear side. The component mounting bracket 25 is stacked so as to cover the front edge portion of the corresponding floor frame 10 on the left and right from below, and is joined to the front edge portion of the floor frame 10 in this state.

The inclined guide portion 24 (front wall 25*b*) of the component mounting bracket 25 is formed with a recessed portion 31 extending in the vertical direction. The recessed portion 31 extends from the front surface of the front wall 25*b* of the component mounting bracket 25 to the front end portion of the lower surface of the lower wall 25*c*. Further, a rear end joint portion 32 joined to the front surface of the inclined guide portion 24 (front wall 25*b*) of the component mounting bracket 25 extends on the lower wall on the rear portion side of each front side frame 7. The rear end joint portion 32 is joined to the front surface of the inclined guide portion 24 (front wall 25*b*) so as to be continuous with the upper end portion (the portion starting to be recessed rearward and downward) of the recessed portion 31.

One end portion of a mount holding plate 27 that holds a support mount 26 (see FIG. 4) of a suspension arm is fastened and fixed to the lower wall of the component mounting bracket 25. Reference numeral 28 in FIG. 7 and FIG. 8 is a bolt insertion hole through which a bolt 29 (see FIG. 4) for fixing the mount holding plate 27 to the component mounting bracket 25 is inserted. The other end portion of the mount holding plate 27 is bolted to the lower surface near the rear portion of the subframe 8. The support mount 26 is fixed to the component mounting bracket 25 and the subframe 8 so as to be sandwiched from above and below by a holding plate on the upper side (not shown) and the mount holding plate 27. The component mounting bracket 25 is formed of an aluminum casting similar to the subframe 8 or a member having a rigidity equivalent to that of the aluminum casting.

The subframe 8 includes a subframe body 41 having a substantially rectangular shape in the plan view to which the steering gear box 40 (mounted component) is attached on the upper surface on the rear portion side, a pair of leg portions 42 protruding upward from the left and right front regions of the subframe body 41, the front fastening portions 34 provided on top portions 42*a* of the leg portions 42 and fastened to the corresponding front side frames 7 on the left and right, and the rear fastening portions 35 arranged in the left and right rear regions of the subframe body 41 and fastened to the lower ends (support plate 14) of the left and right mount brackets 13 described above. In the present embodiment, the mount bracket 13, the support plate 14, the component mounting bracket 25, the dash lower panel 5, etc. constitute the vehicle compartment front structure body 30 arranged in the front portion of the vehicle compartment 2.

The front fastening portion 34 is configured with a fixing nut (not shown) provided on a side surface of the top portion 42*a* on the outer side in the vehicle width direction as a main element. The front fastening portion 34 is fastened and fixed to the mounting bracket 23 (subframe mounting portion) of the corresponding front side frame 7 on the left and right by a bolt 43 (see FIG. 4 and FIG. 6). The mounting bracket 23 is formed with a slit 44 (see FIG. 13) that opens downward in a fastening wall that is overlapped with the side wall of the top portion 42*a*. The bolt 43 is fastened to the fixing nut of the front fastening portion 34 with the shaft portion in a horizontal posture in a state where the shaft portion is inserted through the slit 44. As a result, the front fastening portion 34 of the subframe 8 is fastened and fixed to the corresponding front side frame 7 on the left and right. However, since the fastening wall of the mounting bracket 23 is formed with the slit 44 that opens downward, when an excessive downward relative load acts on the shaft portion of the bolt 43 through the leg portion 42 of the subframe 8, the shaft portion of the bolt 43 slips through the slit 44 and falls downward together with the leg portion 42.

The inclined guide portion 24 of the component mounting bracket 25 described above is arranged on a track in which the top portion 42*a* of the leg portion 42 detached from the front side frame 7 is displaced rearward when an impact load is input from the rear of the vehicle. Further, as shown in FIG. 3, the component mounting bracket 25 is arranged so as to be aligned with the top portion 42*a* of the corresponding leg portion 42 on the left and right of the subframe 8 in the vehicle front-rear direction.

Figure 9:
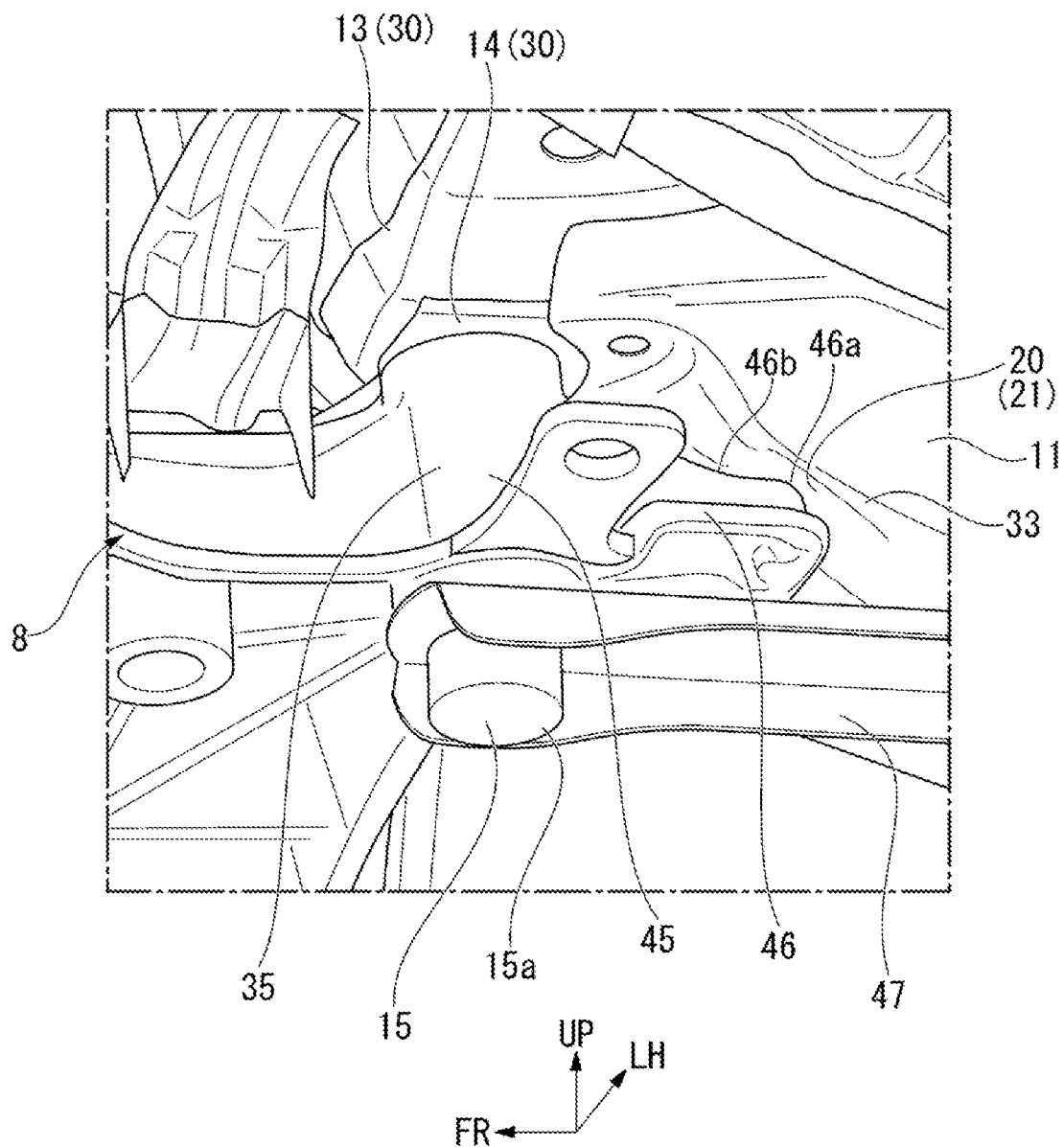
FIG. 9 is an enlarged view of the part IX of FIG. 4 of the front portion of the vehicle of the embodiment with some components removed.
Figure 10:
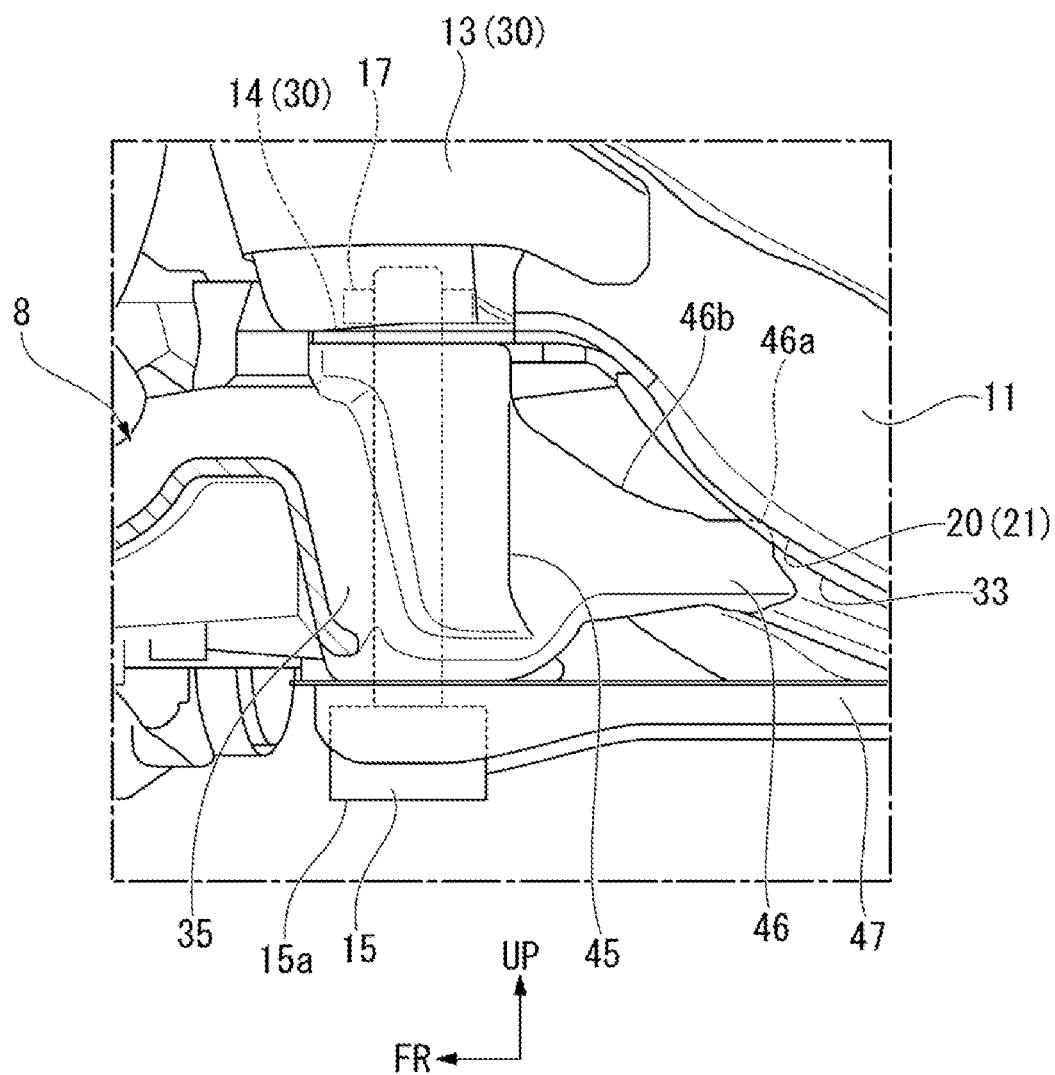
FIG. 10 is an enlarged view of the part X of FIG. 5 of the vehicle of the embodiment.

FIG. 9 is an enlarged view of the part IX of FIG. 4 with some components removed, and FIG. 10 is an enlarged view of the part X of FIG. 5. As shown in these drawings, the rear fastening portion 35 of the subframe 8 includes a tubular body 45 through which the bolt 15 penetrates in the vertical direction, and a convex portion 46 protruding from the tubular body toward the vehicle rear side. The rear fastening portion 35 is fixed to the lower end of the mount bracket 13 by the bolt 15 penetrating the support plate 14 at the lower end of the mount bracket 13 and being fastened to the fixing nut 17. In this state, the tip portion of the convex portion 46 directed toward the vehicle rear side faces the inclined guide portion 33 in the front portion of the tunnel frame 11.

The inclined wall 20 of the inclined guide portion 33 faces the convex portion 46 from the vehicle rear side at the position rearward of the fastening portion (fixing nut 17) of the support plate 14. The inclined wall 20 constitutes a fall restricting wall against which the convex portion 46 is pressed from the front when an impact load is input from the front of the vehicle. When an impact load is input, the convex portion 46 is pressed against the front surface of the rear fastening portion 35, so that the falling of the tubular body 45 in the direction in which the tip portion of the convex portion 46 is lifted upward is restricted. The inclined wall 20 constitutes the fall restricting wall that restricts the falling of the tubular body 45.

As shown in FIG. 9 and FIG. 10, the convex portion 46 of the rear fastening portion 35 includes a contact surface 46*a* that comes into contact with the inclined wall 20 which is the fall restricting wall when an impact load is input from the front of the vehicle, and an upper inclined surface 46*b* that inclines downward from the upper region of the tubular body 45 toward the vehicle rear side and connects the upper region and the contact surface 46a.

Further, as shown in FIG. 9 and FIG. 10, one end portion of a long hinge plate 47 having a U-shaped cross section is fastened and fixed between the lower surface of the tubular body 45 of the rear fastening portion 35 and a head portion 15a of the bolt 15. The other end portion of the hinge plate 47 is fixed to the lower surface near the front portion of the tunnel frame 11. The hinge plate 47 controls the falling behavior of the subframe 8 when the subframe 8 falls at the time of input of an impact load from the vehicle front side.

Figure 11:
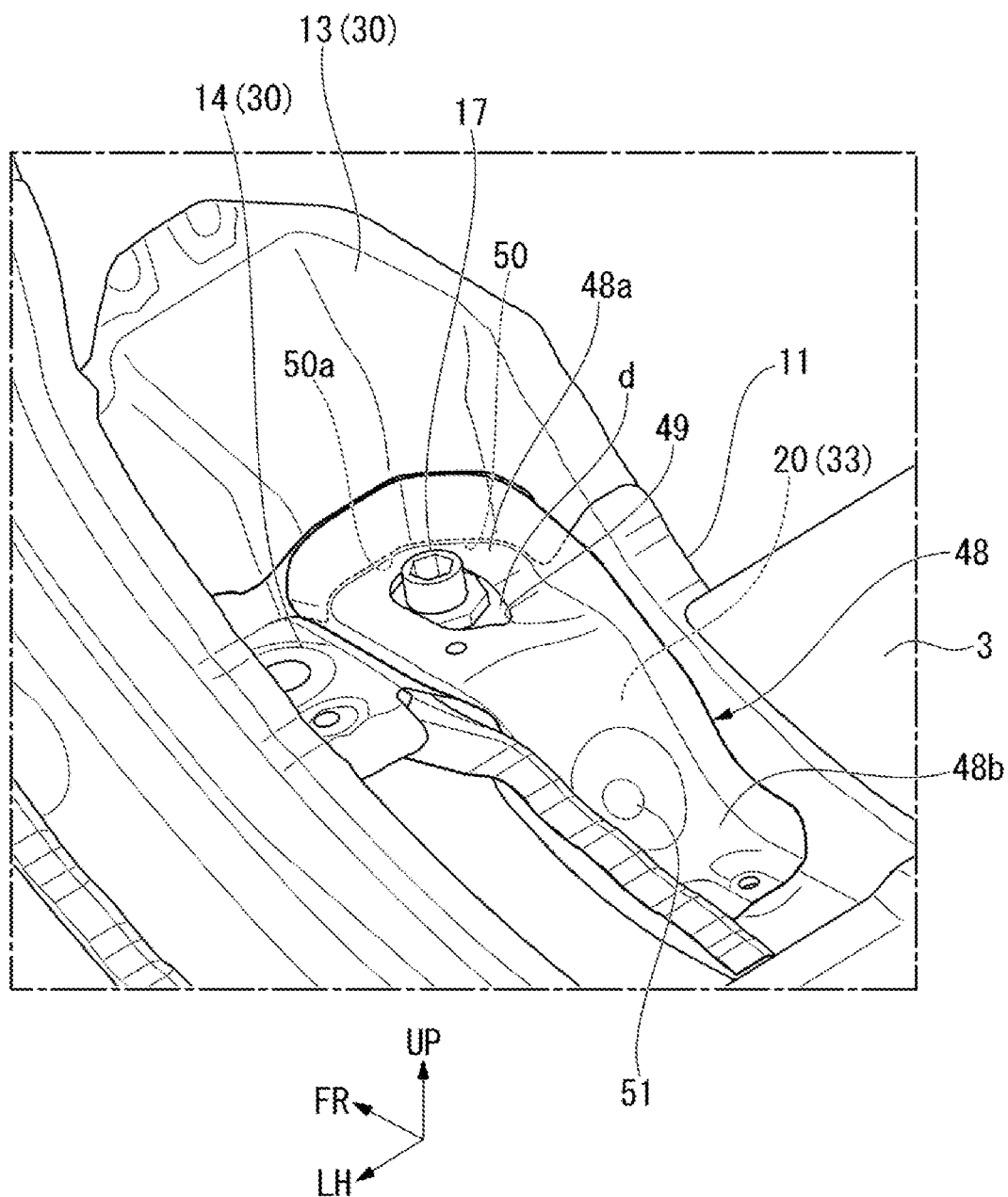
FIG. 11 is a perspective view, corresponding to the arrow view XI of FIG. 5, of the front portion of the vehicle of the embodiment.

FIG. 11 is a perspective view corresponding to the arrow view XI of FIG. 5. As shown in FIG. 11, a highly rigid reinforcing plate 48 (reinforcing member) is attached to the rear surface side of the inclined wall 20 (fall restricting wall) in the front portion of the tunnel frame 11. The reinforcing plate 48 has an upper joint portion 48a joined to the upper surface of the support plate 14, and an inclined portion joint portion 48b that includes downward from the rear portion of the upper joint portion 48a toward the vehicle rear side and is joined to the rear surface of the tunnel frame 11.

The upper joint portion 48a is formed with an elongated hole 49 that surrounds the fixing nut 17 fixed to the upper surface of the support plate 14 and has a gap d between the upper joint portion 48a and the rear portion of the fixing nut 17. The support plate 14 is joined to the edge portion of the opening 50 at the lower end of the mount bracket 13. The fixing nut 17 fixed on the support plate 14 is arranged close to an edge portion 50a on the front side of the opening 50.

The inclined portion joint portion 48b is formed with a reinforcing convex portion 51 that bulges toward the vehicle front side at a position rearward of the inclined wall 20 (fall restricting wall). The reinforcing convex portion 51 supports the inclined wall 20 from the rear side when the convex portion 46 of the rear fastening portion 35 is pressed against the front surface side of the inclined wall 20 at the time of input of an impact load from the front of the vehicle.

In addition, as shown in FIG. 2 and FIG. 5, the steering gear box 40 mounted on the upper surface on the rear portion side of the subframe 8 has an assist motor 40a arranged at a portion slightly to the right of the center in the vehicle width direction. The motor 40a has a relatively large outer diameter, and as shown in FIG. 2, the motor 40a bulges to the rearmost upper side in the steering gear box 40. The front surface of an inclined guide portion 60 of the dash lower panel 5 faces the rear side of the motor 40a. The front surface of the inclined guide portion 60 inclines downward toward the vehicle rear side, and when an impact load is input from the front of the vehicle, the motor 40a comes into contact with the front surface along with the rearward displacement of the subframe 8. Further, as shown in FIG. 2, a dash cross member 55 extending along the vehicle width direction is arranged on the rear surface of the dash lower panel 5. The dash cross member 55 is joined to the rear surface position of the inclined guide portion 60 on the rear surface of the dash lower panel 5.

Here, a case of the motor 40a is formed of a material having higher rigidity than an aluminum casting such as a steel material. That is, the case of the motor 40a has higher rigidity than the leg portions 42 of the subframe 8 made of an aluminum casting. The front surface of the inclined guide portion 60 of the dash lower panel 5 with which the motor 40a comes into contact when an impact load is input from the front of the vehicle is set to a gentle downward inclination angle compared with the front surface of the inclined guide portion 24 of the component mounting bracket 25 with which the top portion 42a of the leg portion 42 comes into contact.

In addition, the front surface of the inclined guide portion 60 of the dash lower panel 5 is arranged to face the rear side of the motor 40a, and the front surface of the inclined wall 20 in the front portion of the tunnel frame 11 is arranged to face the rear side of the rear fastening portion 35 of the subframe 8. The separation distance between the rear fastening portion 35 and the inclined wall 20 is set shorter than the separation distance between the motor 40a and the inclined guide portion 60. Further, the separation distance between the top portion 42a of the leg portion 42 of the subframe 8 and the inclined guide portion 24 of the component mounting bracket 25 is set longer than the separation distance between the motor 40a and the inclined guide portion 60. Therefore, when an impact load is input from the front of the vehicle, the rear fastening portion 35 comes into contact with the inclined wall 20 first, and then the motor 40a comes into contact with the inclined guide portion 60, and thereafter the top portion 42a of the leg portion 42 comes into contact with the inclined guide portion 24.

Figure 12:
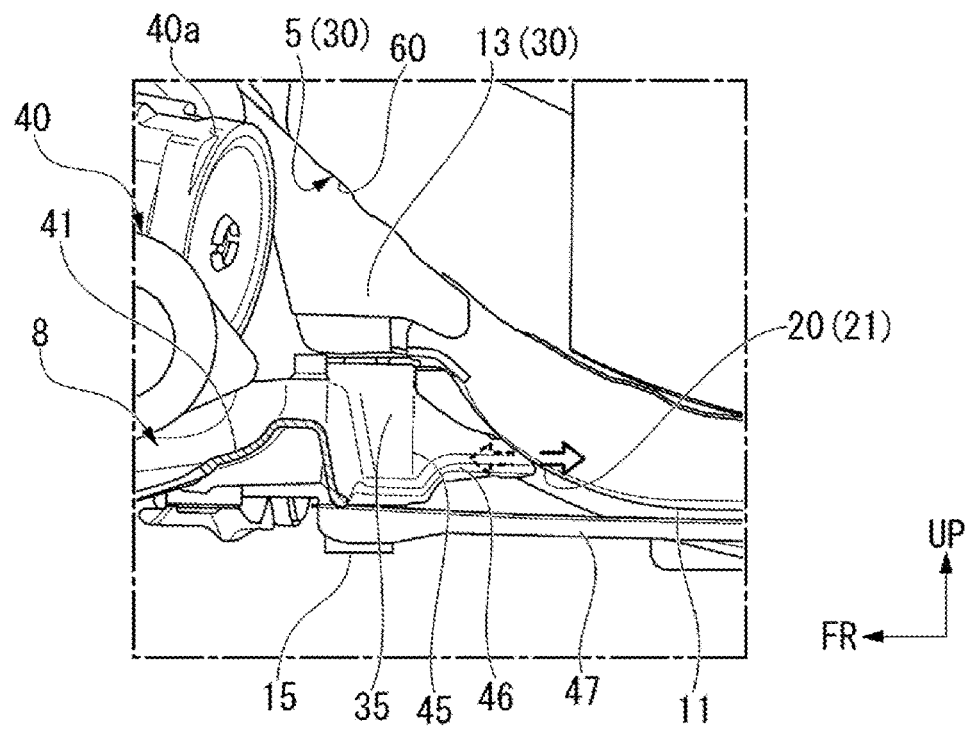
FIG. 12 is a partial cross-sectional side view similar to FIG. 6 showing the deformation behavior of the front portion of the vehicle of the embodiment.

Subsequently, an example of the deformation behavior of the front portion of the vehicle 1 when an impact load is input from the front surface of the vehicle 1 will be described with reference to FIG. 12 to FIG. 18. When an impact load is input from the front surface of the vehicle 1, the subframe 8 is pressed toward the vehicle rear side along with the rearward displacement of the power unit such as the engine, and as shown in FIG. 12, the convex portion 46 of the rear fastening portion 35 of the subframe 8 is pressed against the inclined wall 20 in the front portion of the tunnel frame 11. As a result, the convex portion 46 receives a reaction force from the inclined wall 20, and the falling deformation in which the tubular body 45 of the rear fastening portion 35 is lifted upward is restricted. As a result, out-of-plane deformation of the support plate 14 to which the bolt 15 is fastened is suppressed. When the subframe 8 is further pressed toward the vehicle rear side in this state, the support plate 14 starts to break, and the convex portion 46 of the rear fastening portion 35 is guided rearward and downward along the inclined wall 20.

Figure 13:
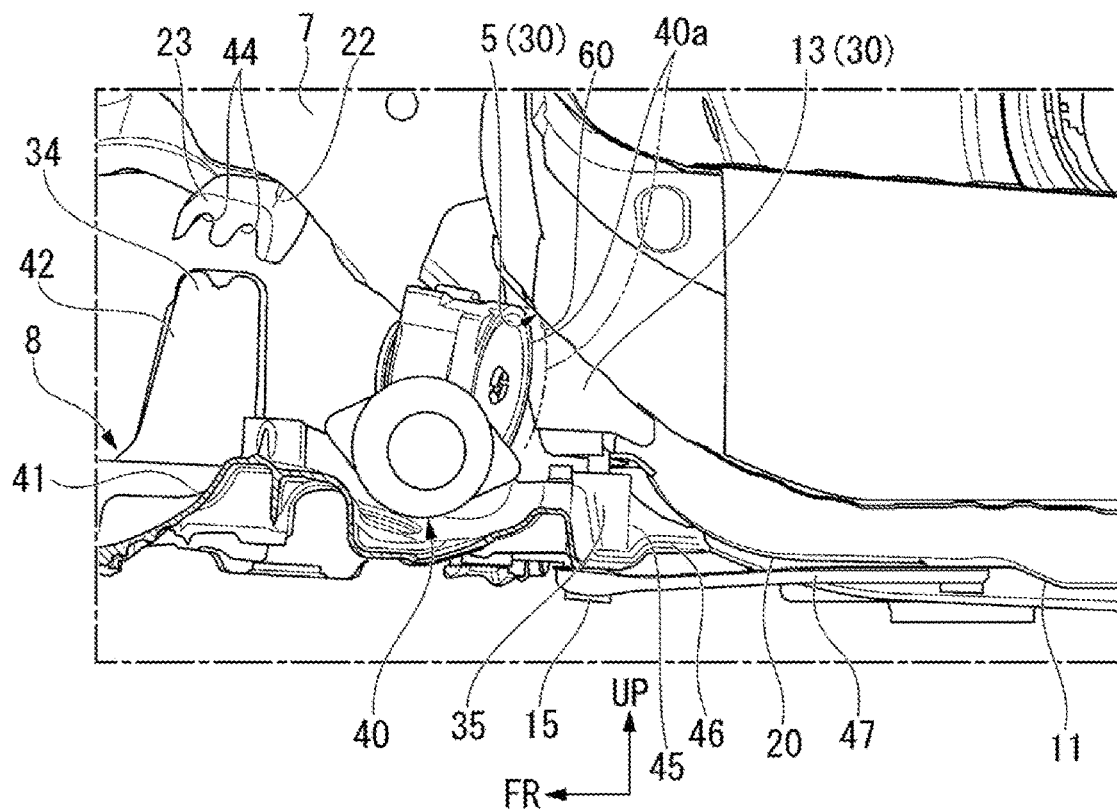
FIG. 13 is a partial cross-sectional side view similar to FIG. 6 showing the deformation behavior of the front portion of the vehicle of the embodiment.

On the other hand, when an impact load is input from the front surface to the front portion of the front side frame 7, as shown in FIG. 13, with the bending starting point 22 near the rear portion as the starting point, the front side frame 7 starts to bend and deform so that the front portion of the bending starting point 22 is lifted upward. As a result, the mounting bracket 23 (subframe mounting portion) of the front side frame 7 is lifted upward, while the subframe 8 continues to be pressed toward the vehicle rear side. As a result, the bolt 43 of the front fastening portion 34 is detached downward from the slit 44 of the mounting bracket 23, and the leg portion 42 of the subframe 8 falls downward from the front side frame 7.

Figure 14:
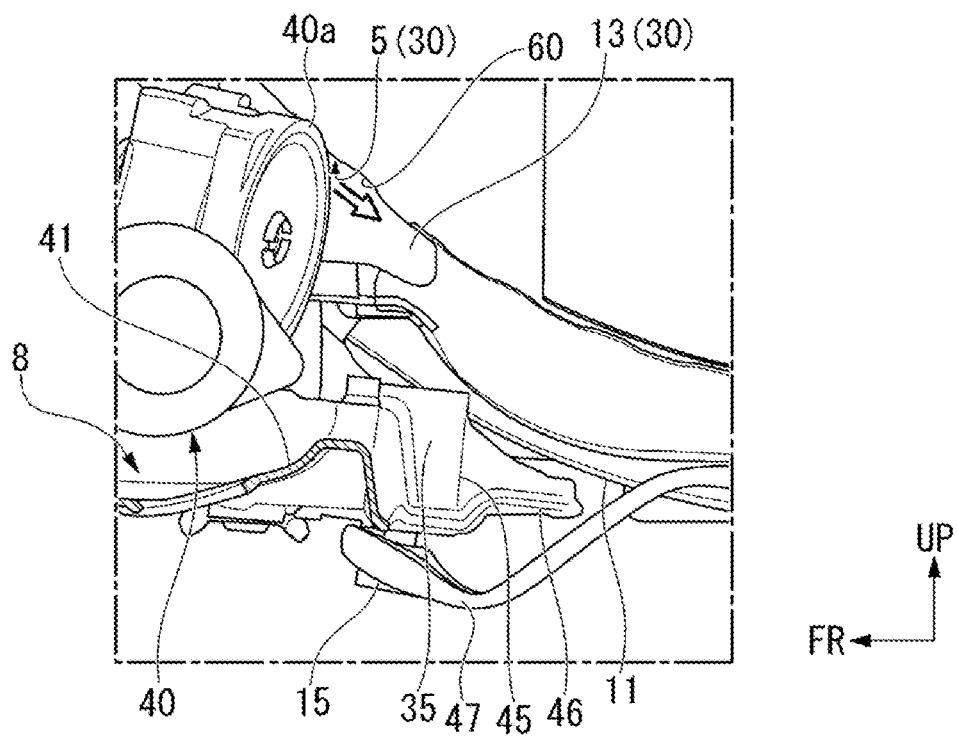
FIG. 14 is a partial cross-sectional side view similar to FIG. 6 showing the deformation behavior of the front portion of the vehicle of the embodiment.
Figure 15:
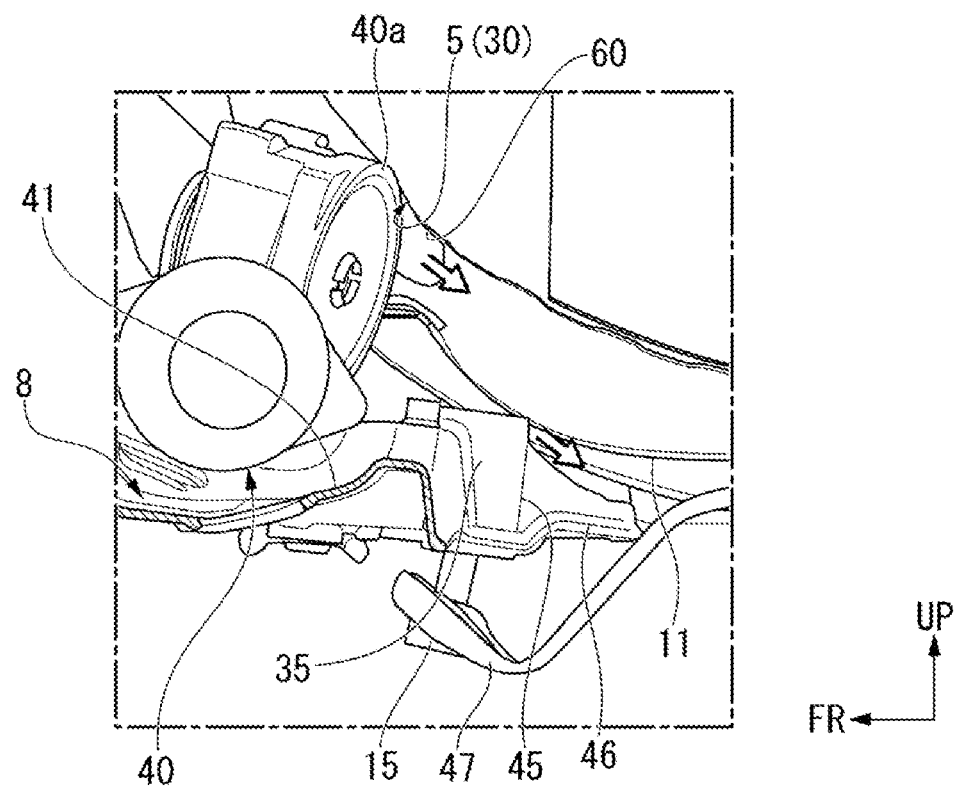
FIG. 15 is a partial cross-sectional side view similar to FIG. 6 showing the deformation behavior of the front portion of the vehicle of the embodiment.
Figure 16:
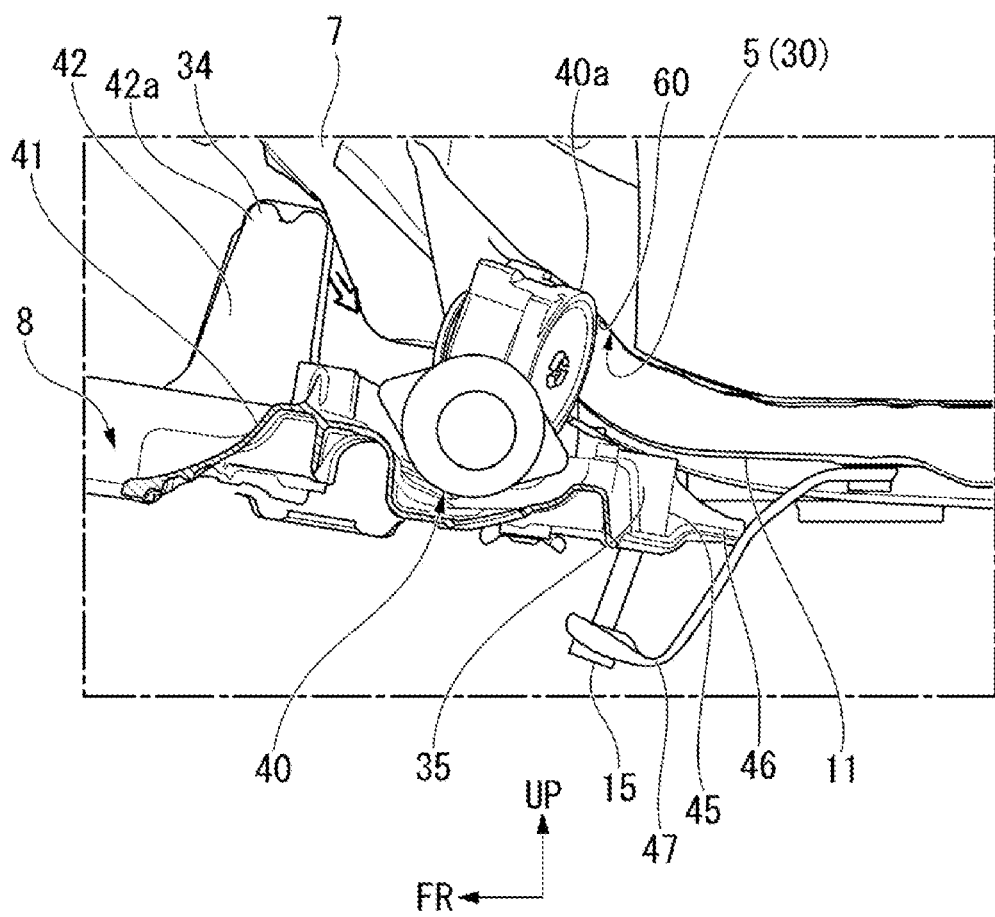
FIG. 16 is a partial cross-sectional side view similar to FIG. 6 showing the deformation behavior of the front portion of the vehicle of the embodiment.

Moreover, when the input of the impact load continues, as shown in FIG. 14, the front fastening portion is completely detached from the mount bracket 13 together with the bolt 15 due to the breakage of the support plate 14, and the motor 40a on the subframe 8 comes into contact with the inclined guide portion 60 of the dash lower panel 5. As a result, the motor 40a is guided rearward and downward along the inclined guide portion 60. Further, as shown in FIG. 15, before and after the contact between the motor 40a and the inclined guide portion 60, the tubular body 45 of the rear fastening portion 35 comes into contact with the inclined wall 20, and the tubular body 45 is guided rearward and downward along the inclined wall 20.

Figure 17:
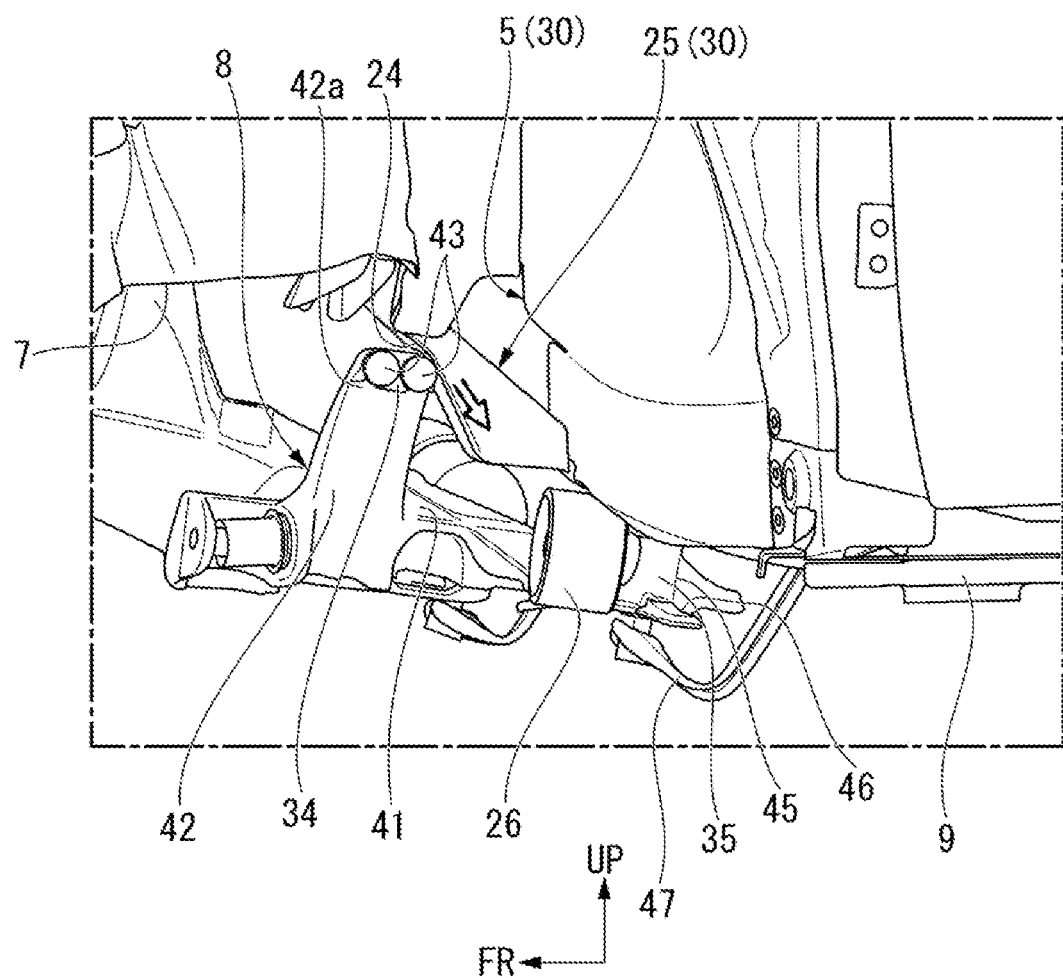
FIG. 17 is a partial cross-sectional side view similar to FIG. 6 showing the deformation behavior of the front portion of the vehicle of the embodiment.
Figure 18:
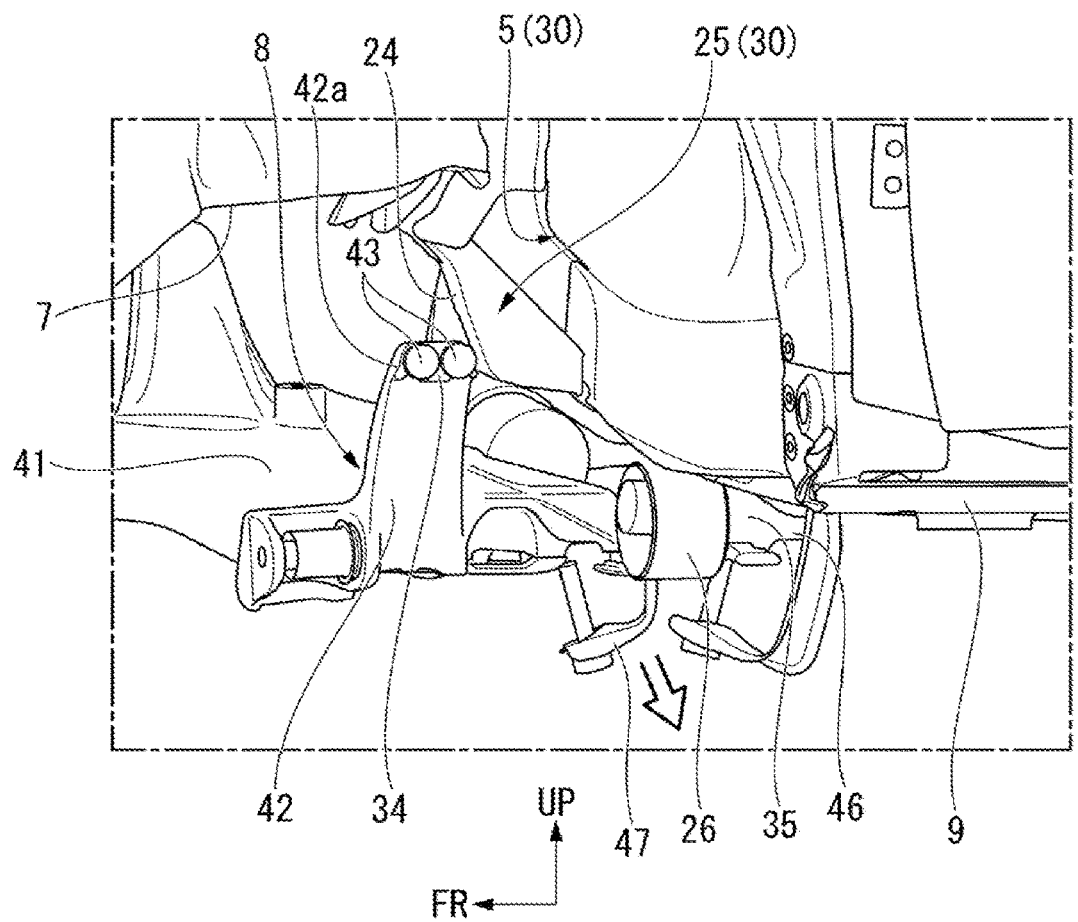
FIG. 18 is a partial cross-sectional side view similar to FIG. 6 showing the deformation behavior of the front portion of the vehicle of the embodiment.

Thereafter, when the input of the impact load further continues, the entire subframe 8 is displaced rearward while inclining rearward, and as shown in FIG. 17, the top portion 42a of the leg portion 42 of the subframe 8 comes into contact with the inclined guide portion 24 of the component mounting bracket 25. As a result, the top portion 42a of the leg portion 42 is guided rearward and downward along the slope of the inclined guide portion 24. In this way, when the guidance of the leg portion 42 performed by the inclined guide portion 24 is completed, the entire subframe 8 falls below the dash lower panel 5 as shown in FIG. 18.

As described above, in the front structure of the vehicle body according to the present embodiment, the mounting bracket 23 (subframe mounting portion) is provided on the front side of the bending starting point 22 of the front side frame 7 on the left and right and the front fastening portion 34 of the subframe 8 is fastened to the mounting bracket 23, and the component mounting bracket 25 having the inclined guide portion 24 is coupled below the rear portion side of the bending starting point 22 of the front side frame 7 on the left and right. Then, the inclined guide portion 24 is arranged on a track in which the leg portion 42 of the subframe 8 detached from the front side frame 7 is displaced rearward when an impact load is input from the front of the vehicle. Therefore, when an impact load is input from the front of the vehicle, the leg portion 42 of the subframe 8 detached along with the bending and deformation of the front side frame 7 comes into contact with the inclined guide portion 24 along with the rearward displacement of the subframe 8 and is guided rearward and downward of the inclined guide portion 24. Accordingly, when the front structure of the vehicle body according to the present embodiment is adopted, the subframe 8 can be smoothly dropped downward on the front side of the vehicle compartment 2 when an impact load is input from the front of the vehicle.

Further, in the front structure of the vehicle body according to the present embodiment, the front fastening portion 34 having the fixing nut is provided on the side surface of the top portion 42a of the leg portion 42 of the subframe 8, and the mounting bracket 23 (subframe mounting portion) is provided with the slit 44 that opens downward for inserting a bolt. Then, the bolt 43 inserted through the slit 44 is fastened to the fixing nut, so that the front fastening portion 34 is locked to the front side frame 7. Therefore, when the front side frame 7 bends and deforms with the bending starting point 22 as the center at the time of input of an impact load from the front of the vehicle, the front fastening portion 34 is pulled relatively downward, and the bolt 43 fixed to the fixing nut of the front fastening portion 34 is pulled downward along the slit 44. Accordingly, when this configuration is adopted, the front fastening portion 34 of the subframe 8 is stably dropped rearward and downward when an impact load is input from the front of the vehicle.

In addition, in the front structure of the vehicle body according to the present embodiment, the subframe 8 is made of an aluminum casting. Therefore, the rigidity of the subframe 8 becomes high, and when an impact load is input from the front of the vehicle, the top portion 42a of the leg portion 42 is stably guided rearward and downward while biting into the inclined guide portion 24.

Furthermore, in the front structure of the vehicle body according to the present embodiment, the inclined guide portion 24 is provided with the recessed portion 31 that extends in the vertical direction. Therefore, the inclined guide portion 24 is firmly reinforced by the recessed portion 31 that extends in the vertical direction. Further, when an impact load is input from the front of the vehicle, it is possible to slide down the top portion 42a of the leg portion 42 of the subframe 8 rearward and downward along the recessed portion 31.

Further, in the front structure of the vehicle body according to the present embodiment, the recessed portion 31 extends from the front surface to the lower surface of the component mounting bracket 25. Therefore, when the top portion 42a of the leg portion 42 of the subframe 8 is pressed against the inclined guide portion 24 at the time of input of an impact load from the front of the vehicle, the top portion 42a can be properly slid down rearward and downward along the recessed portion 31 without being caught excessively. Further, in the present embodiment, the rear end joint portion 32 at the rear portion of the front side frame 7 is joined to the front surface of the component mounting bracket 25 so as to be continuous with the upper end portion of the recessed portion 31. Therefore, when an impact load is input from the front of the vehicle, the load transmitted to the rear portion of the front side frame 7 can be properly transmitted to the further rear side of the vehicle via the component mounting bracket 25.

In addition, in the front structure of the vehicle body according to the present embodiment, the component mounting bracket 25 that comes into contact with the leg portion 42 of the subframe 8 when an impact load is input from the front of the vehicle is made of a member having a rigidity equivalent to that of the subframe 8. Therefore, when the leg portion 42 of the subframe 8 comes into contact with the inclined guide portion 24, the top portion 42a of the leg portion 42 can be properly guided rearward and downward without causing excessive deformation of one member. Further, when the outer side portion in the vehicle width direction of the mount holding plate 27 that holds the support mount 26 of the suspension arm is attached to the component mounting bracket 25, and the inner side portion in the vehicle width direction of the mount holding plate 27 is attached to the subframe 8, the support rigidities of the inner side portion and the outer side portion in the vehicle width direction of the mount holding plate 27 become equal, and the steering stability of the vehicle is improved.

Furthermore, in the present embodiment, the component mounting bracket 25 is arranged so as to be aligned with the top portion 42a of the corresponding leg portion 42 on the left and right of the subframe 8 in the vehicle front-rear direction, and therefore, when an impact load is input from the front of the vehicle, the top portion 42a of the leg portion 42 of the subframe 8 can be reliably brought into contact with the inclined guide portion 24 of the component mounting bracket 25, and can be smoothly slid down rearward and downward.

Further, in the front structure of the vehicle body according to the present embodiment, the front portion of the tunnel frame 11 is provided with the inclined guide portion 33 (second inclined guide portion) having a front surface that inclines downward toward the vehicle rear side, and the inclined guide portion 33 is arranged on a track in which the rear fastening portion 35 is displaced rearward when an impact load is input from the front of the vehicle. Therefore, when an impact load is input from the front of the vehicle, the rear fastening portion 35 is guided by the inclined guide portion 33 and guided rearward and downward, and the leg portion 42 having the front fastening portion 34 is guided by the inclined guide portion 24 of the component mounting bracket 25 and guided rearward and downward. Accordingly, when this configuration is adopted, it is possible to stably drop the subframe 8 below the front portion of the vehicle compartment.

In the above embodiment, the front side frame 7 has a structure that bends and deforms in the vertical direction when an impact load is input from the front of the vehicle. However, when the front side frame 7 has a structure that bends and deforms in the vehicle width direction, the leg portion 42 of the subframe and the front side frame 7 can adopt a coupling portion structure as shown in FIG. 19.

Figure 19:
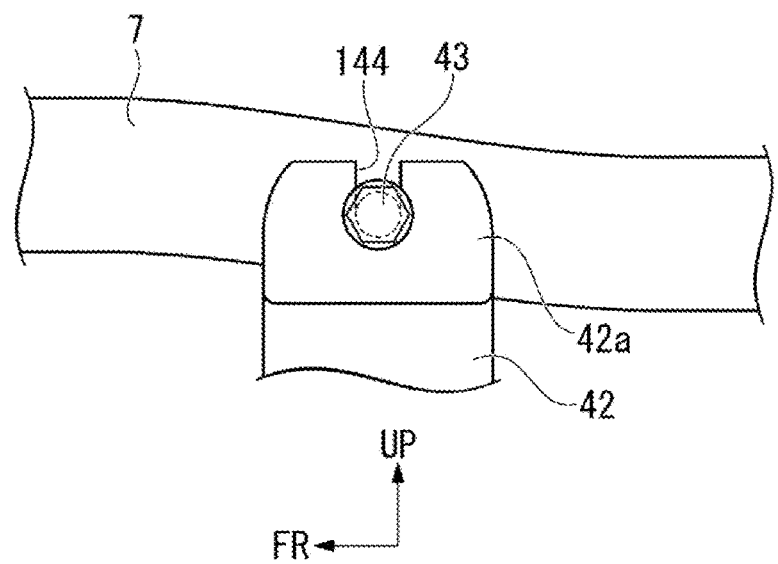
FIG. 19 is a bottom view showing the fastening portion between the leg portion of the subframe and the front side frame of another embodiment.

FIG. 19 is a bottom view showing the fastening portion between the leg portion 42 of the subframe and the front side frame 7, and is a bottom view showing the detachment behavior of the leg portion 42. In the present embodiment, a fixing nut (not shown) to which the bolt 43 is fastened is provided on the lower surface side of the front side frame 7, and a slit 144 that opens outward in the vehicle width direction for inserting a bolt is formed on the upper surface of the top portion 42a of the leg portion 42 of the subframe. The top portion 42a (front fastening portion) of the leg portion 42 is locked to the front side frame 7 by fastening the bolt 43 inserted through the slit 144 into the fixing nut.

Figure 20:
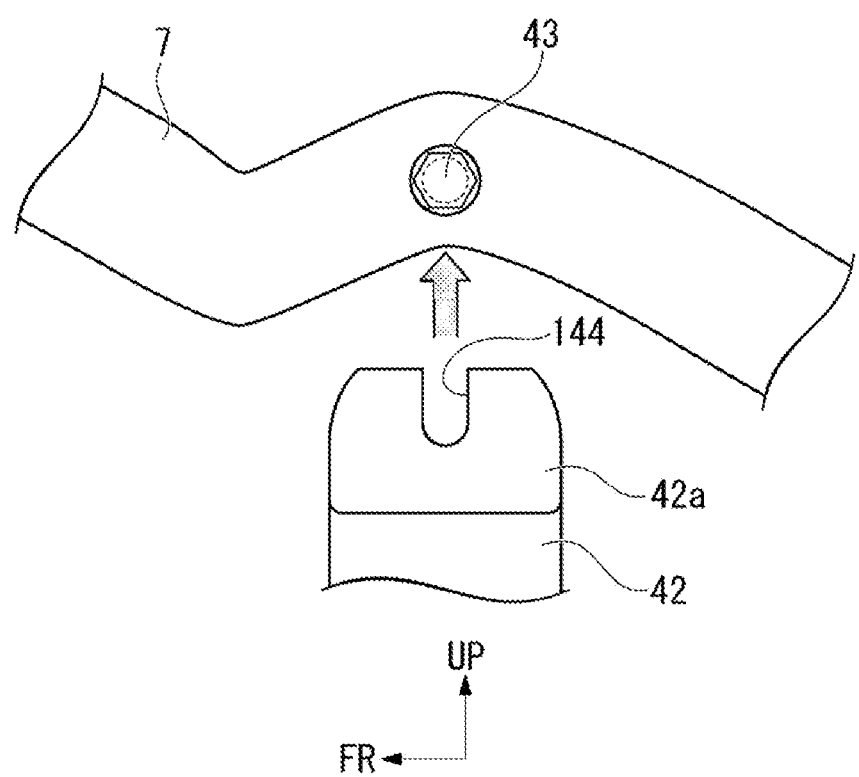
FIG. 20 is a bottom view showing the detachment behavior of the leg portion of another embodiment.

In the case of the structure according to the present embodiment, as shown in FIG. 20, when the front side frame 7 bends and deforms in the vehicle width direction at the time of input of an impact load from the front of the vehicle, the bolt 43 fixed to the fixing nut is pushed outward in the vehicle width direction along with the bending and deformation. At this time, the bolt 43 comes outside the leg portion 42 in the vehicle width direction along the slit 144. Accordingly, when this configuration is adopted, the leg portion 42 of the subframe 8 is reliably detached from the front side frame 7 and the subframe 8 falls rearward and downward when an impact load is input from the front of the vehicle.

Nevertheless, the disclosure is not limited to the above embodiment, and various design changes can be made without departing from the gist thereof.

What is claimed is:

1. A front structure of a vehicle body, comprising:
   a pair of left and right front side frames extending to a front of a vehicle on a front side of a vehicle compartment;
   a subframe erected below the pair of front side frames; and
   a vehicle compartment front structure body arranged in a front portion of the vehicle compartment,
   wherein the subframe comprises:
   a subframe body supporting a mounted component;
   a leg portion protruding upward from a front region of the subframe body;
   a front fastening portion provided at a top portion of the leg portion and fastened to the front side frame; and
   a rear fastening portion fastened to the vehicle compartment front structure body in a rear region on left and right of the subframe body,
   wherein the front side frame comprises:
   a bending starting point which is a starting point of bending and deformation when an impact load is input from the front of the vehicle; and
   a subframe mounting portion which is arranged on a front side of the bending starting point and to which the front fastening portion is fastened,
   wherein a component mounting bracket having an inclined guide portion with a front surface inclining downward toward a vehicle rear side is coupled below a rear portion side of the bending starting point of the front side frame, and
   the inclined guide portion is arranged on a track in which the leg portion detached from the front side frame is displaced rearward when the impact load is input from the front of the vehicle.

2. The front structure of the vehicle body according to claim 1, wherein the front fastening portion having a fixing nut to which a bolt is fastened is provided on a side surface of the top portion of the leg portion,
   the subframe mounting portion has a slit that opens downward for inserting the bolt, and
   the front fastening portion is locked to the front side frame by fastening the bolt inserted through the slit to the fixing nut.

3. The front structure of the vehicle body according to claim 1, wherein the subframe is an aluminum casting.

4. The front structure of the vehicle body according to claim 3, wherein the component mounting bracket is an aluminum casting or a member having a rigidity equivalent to a rigidity of the aluminum casting.

5. The front structure of the vehicle body according to claim 1, wherein the inclined guide portion has a recessed portion that extends in a vertical direction.

6. The front structure of the vehicle body according to claim 5, wherein the recessed portion extends from a front surface to a lower surface of the component mounting bracket, and
   a rear end joint portion joined to the front surface of the component mounting bracket so as to be continuous with an upper end portion of the recessed portion is provided on a lower wall on a rear portion side of the front side frame.

7. The front structure of the vehicle body according to claim 1, wherein the component mounting bracket is arranged so as to be aligned with the top portion of the leg portion of the subframe in a vehicle front-rear direction.

8. The front structure of the vehicle body according to claim 7, wherein a tunnel frame that extends in the vehicle front-rear direction is arranged at a position deviated from the front side frame in a vehicle width direction below the vehicle compartment,
   a second inclined guide portion having a front surface that inclines downward toward the vehicle rear side is provided at a front portion of the tunnel frame, and
   the second inclined guide portion is arranged on a track in which the rear fastening portion is displaced rearward when the impact load is input from the front of the vehicle.

9. The front structure of the vehicle body according to claim 1, wherein the subframe mounting portion has a fixing nut which is provided on a lower surface of the front side frame and to which a bolt is fastened,
   the front fastening portion having a slit that opens outward in a vehicle width direction for inserting a bolt is provided on an upper surface of the top portion of the leg portion, and
   the front fastening portion is locked to the front side frame by fastening the bolt inserted through the slit to the fixing nut.

* * * * *